A blade clamp, for use with a power tool having a reciprocating spindle, includes a cover rotatably coupled to the spindle and a detent received within a bore of the spindle. The detent is movable in a radial direction relative to a longitudinal axis of the spindle to adjust the blade clamp between a locked configuration and an unlocked configuration. The cover is rotatable between a first rotational position relative to the spindle coinciding with the locked configuration, and a second rotational position relative to the spindle coinciding with the unlocked configuration. The blade clamp further includes a sleeve in which the detent is slidably received. The sleeve includes a non-corrosive material for inhibiting corrosion of the detent.

(12) United States Patent
Cholst et al.

(10) Patent No.: US 11,065,698 B2
(45) Date of Patent: Jul. 20, 2021

(54) BLADE CLAMP FOR RECIPROCATING SAW

(71) Applicant: MILWAUKEE ELECTRIC TOOL CORPORATION, Brookfield, WI (US)

(72) Inventors: Beth E. Cholst, Wauwatosa, WI (US); Troy C. Thorson, Cedarburg, WI (US); Hans T. Banholzer, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 69 days.

(21) Appl. No.: 16/433,059

(22) Filed: Jun. 6, 2019

(65) Prior Publication Data
US 2019/0381586 A1 Dec. 19, 2019

Related U.S. Application Data

(60) Provisional application No. 62/684,836, filed on Jun. 14, 2018.

(51) Int. Cl.
*B23D 51/08* (2006.01)
*B23D 51/10* (2006.01)
(Continued)

(52) U.S. Cl.
CPC ............. *B23D 51/10* (2013.01); *B23D 51/08* (2013.01); *B27B 19/00* (2013.01); *B27B 19/02* (2013.01); *B23D 49/14* (2013.01); *B23D 49/162* (2013.01)

(58) Field of Classification Search
CPC ...... B23D 51/10; B23D 51/08; B23D 49/162; B27B 19/00; B27B 19/02
(Continued)

(56) References Cited

U.S. PATENT DOCUMENTS 2,073,430 A * 3/1937 Tautz ..................... B27B 19/02
  144/250.18
3,688,138 A * 8/1972 Jacyno ................... H02K 7/145
  310/50
(Continued)

FOREIGN PATENT DOCUMENTS

CN 1190290 C 2/2002
CN 1415450 A 5/2003
(Continued)

OTHER PUBLICATIONS

International Search Report for International Application No. PCT/US2019/035691 dated Sep. 24, 2019 (3 pages).

*Primary Examiner* — Sean M Michalski
(74) *Attorney, Agent, or Firm* — Michael Best & Friedrich LLP

(57) ABSTRACT

18 Claims, 15 Drawing Sheets

(51) Int. Cl.
*B27B 19/00* (2006.01)
*B27B 19/02* (2006.01)
*B23D 49/16* (2006.01)
*B23D 49/14* (2006.01)

(58) Field of Classification Search
USPC .................................................. 30/339, 392
See application file for complete search history.

(56) References Cited

U.S. PATENT DOCUMENTS

| | | | |
|---|---|---|---|
| 3,750,283 A * | 8/1973 | Hoffman | B23D 57/0076 30/338 |
| 3,823,473 A | 7/1974 | Hoffman | |
| 5,573,255 A | 11/1996 | Salpaka | |
| 5,609,603 A | 3/1997 | Linden | |
| 5,903,983 A | 5/1999 | Jungmann et al. | |
| 6,209,208 B1 | 4/2001 | Marinkovich et al. | |
| 6,237,231 B1 | 5/2001 | Jungmann et al. | |
| 6,612,039 B2 | 9/2003 | Kakiuchi et al. | |
| 6,725,548 B1 | 4/2004 | Kramer et al. | |
| 6,893,026 B2 | 5/2005 | Yoshimura et al. | |
| 7,040,023 B2 | 5/2006 | Nemazi et al. | |
| 7,871,080 B2 * | 1/2011 | Marini | B23B 31/107 279/71 |
| 8,230,607 B2 | 7/2012 | Limberg et al. | |
| 8,272,135 B2 | 9/2012 | Zhoua | |
| 8,393,625 B2 | 3/2013 | Marini et al. | |
| 8,622,400 B2 | 1/2014 | Lin | |
| 8,641,049 B2 | 2/2014 | Marini et al. | |
| 8,813,372 B2 | 8/2014 | Scott | |
| 8,813,373 B2 | 8/2014 | Scott | |
| 2002/0124419 A1 | 9/2002 | Hirabayashi | |
| 2004/0163264 A1 * | 8/2004 | Simonz | B23D 51/01 30/517 |
| 2004/0194324 A1 * | 10/2004 | Youn-Chyuan | B25B 23/0035 30/337 |
| 2005/0132584 A1 | 6/2005 | Cornwell et al. | |
| 2008/0168666 A1 | 7/2008 | Zhou | |
| 2009/0071015 A1 * | 3/2009 | Scott | B23D 51/10 30/339 |
| 2009/0071016 A1 * | 3/2009 | Scott | B23D 51/10 30/339 |
| 2009/0277022 A1 * | 11/2009 | Limberg | B23B 31/1072 30/392 |
| 2010/0000100 A1 * | 1/2010 | Saegesser | B23D 51/10 30/392 |
| 2011/0232107 A1 * | 9/2011 | da Graca | B23D 49/167 30/338 |
| 2014/0197609 A1 * | 7/2014 | Chen | B25G 3/18 279/97 |
| 2018/0126470 A1 * | 5/2018 | Banholzer | B23D 49/162 |

FOREIGN PATENT DOCUMENTS

| | | |
|---|---|---|
| CN | 100425380 C | 6/2004 |
| CN | 201217103 Y | 4/2009 |
| CN | 101612681 B | 12/2009 |
| CN | 201960209 U | 9/2011 |
| CN | 202701497 U | 1/2013 |
| CN | 204221115 U | 3/2015 |
| CN | 205183945 U | 4/2016 |
| DE | 19543247 B4 | 6/1996 |
| DE | 19947840 B4 | 4/2000 |
| DE | 10123534 B4 | 1/2002 |
| DE | 20307473 U1 | 7/2003 |
| DE | 102011080445 B4 | 2/2013 |
| EP | 716831 B1 | 6/1996 |
| EP | 817693 B1 | 1/1998 |
| EP | 883459 B1 | 12/1998 |
| EP | 1422009 B1 | 5/2004 |
| EP | 1555078 B1 | 7/2005 |
| EP | 1857209 B1 | 11/2007 |
| EP | 1857210 131 | 11/2007 |
| EP | 2554314 B1 | 2/2013 |
| WO | WO 9731745 A2 | 9/1997 |
| WO | WO 9731745 A3 | 9/1997 |
| WO | WO 9734721 A1 | 9/1997 |

* cited by examiner

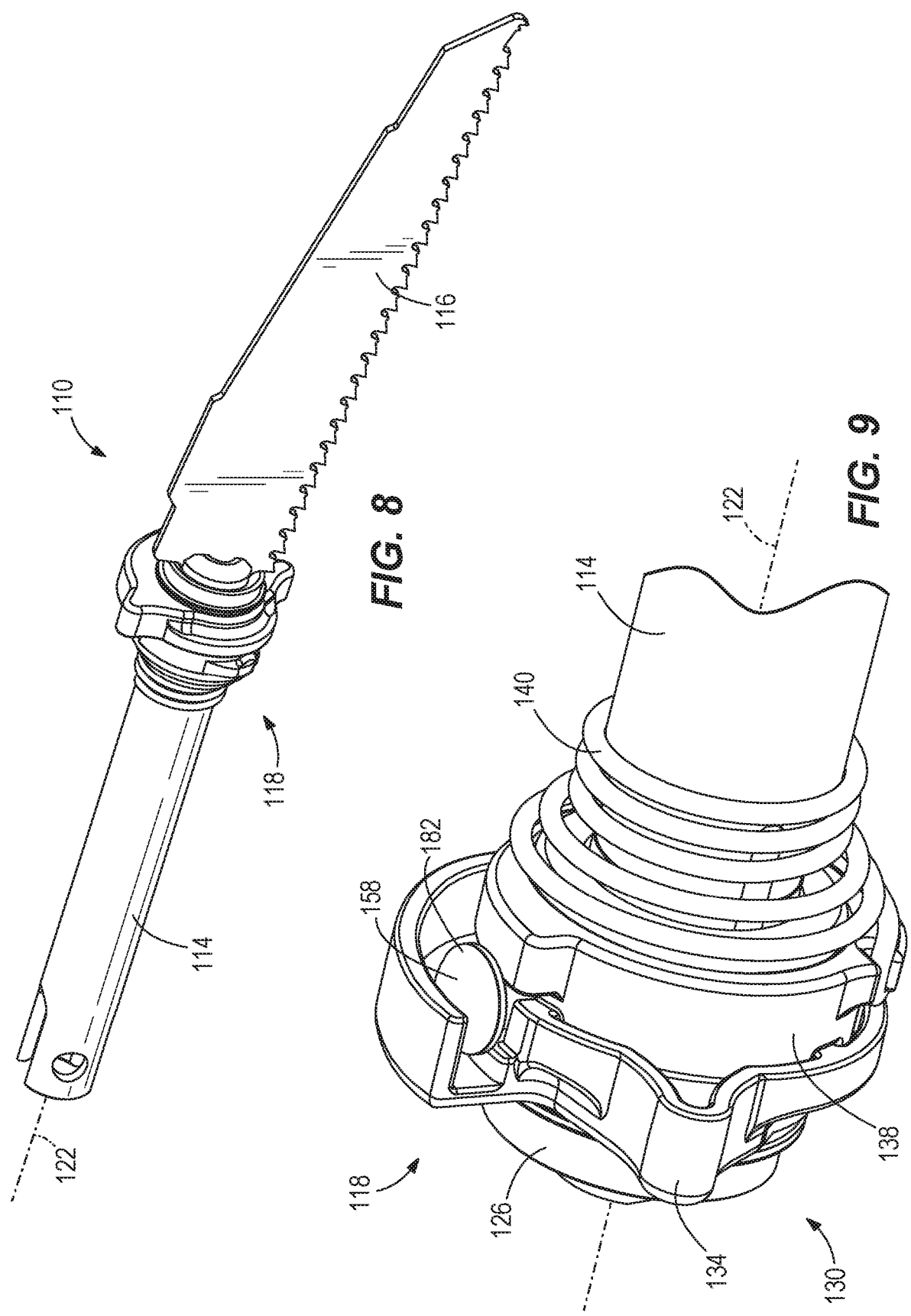

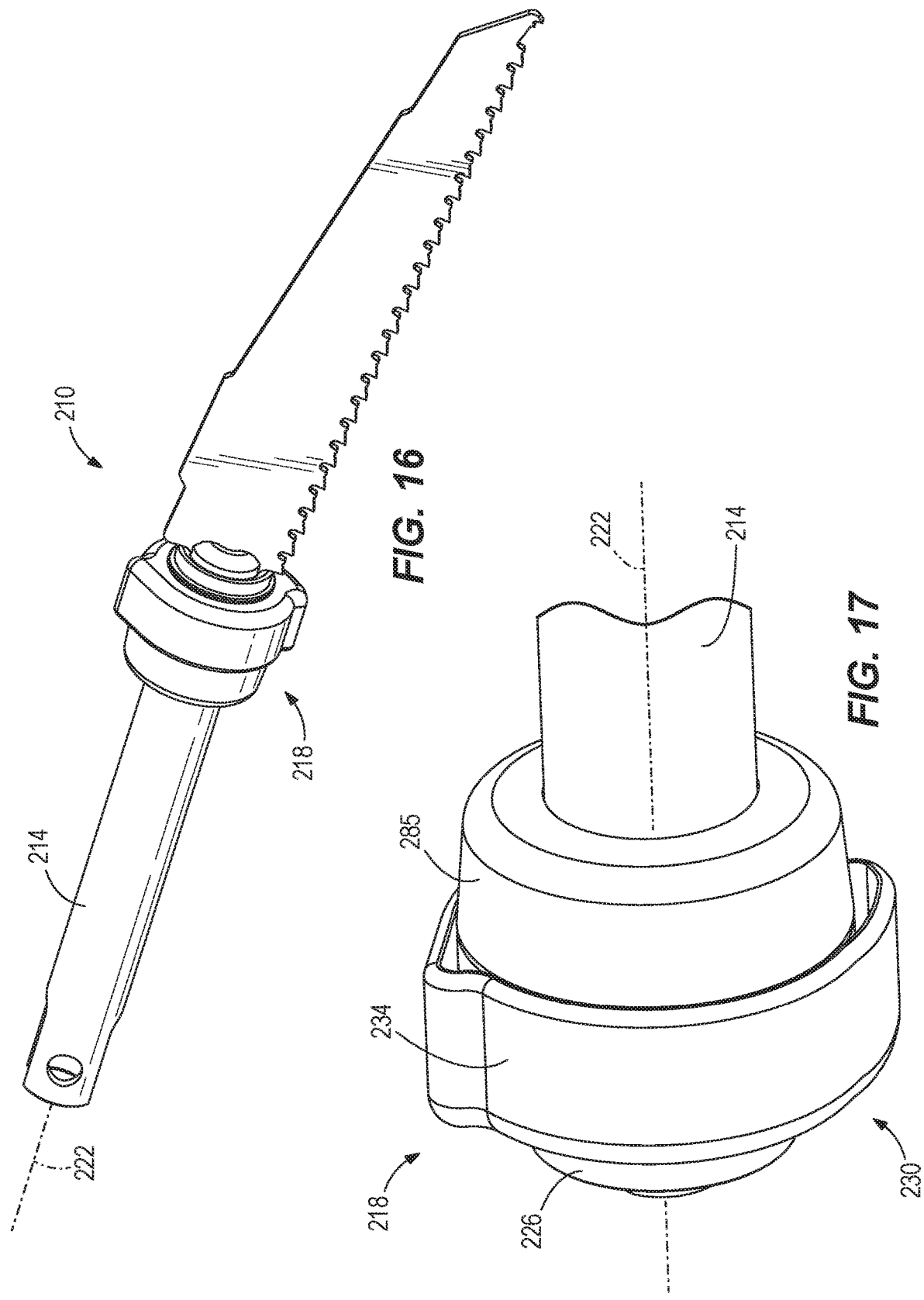

BLADE CLAMP FOR RECIPROCATING SAW

CROSS-REFERENCE TO RELATED APPLICATIONS

This application claims priority to U.S. Provisional Patent Application No. 62/684,836 filed on Jun. 14, 2018, the entire contents of which are incorporated herein by reference.

FIELD OF THE INVENTION

The present invention relates to blade clamps, and more specifically to blade clamps for securing cutting blades to a reciprocating saw.

BACKGROUND OF THE INVENTION

Cutting tools, such as reciprocating saws, typically include a clamp for securing a cutting blade thereto. Such blade clamps may be adjustable between a locked configuration, where the blade is secured to a spindle, and an unlocked configuration, where the blade is removable from the spindle.

SUMMARY OF THE INVENTION

The present invention provides, in one aspect, a blade clamp for use with a power tool having a reciprocating spindle. The blade clamp includes a cover rotatably coupled to the spindle, and a detent received within a bore of the spindle. The detent is movable in a radial direction relative to a longitudinal axis of the spindle to adjust the blade clamp between a locked configuration and an unlocked configuration. The cover is rotatable between a first rotational position relative to the spindle coinciding with the locked configuration, and a second rotational position relative to the spindle coinciding with the unlocked configuration. The blade clamp further includes a sleeve in which the detent is slidably received. The sleeve includes a non-corrosive material for inhibiting corrosion of the detent.

The present invention provides, in another aspect, a blade clamp for use with a power tool having a reciprocating spindle. The blade clamp includes a cover rotatably coupled to the spindle. The cover includes a first ramped surface and a second ramped surface spaced radially inward of the first ramped surface. The blade clamp further includes a spring coupling the cover and the spindle, and a detent received within a bore of the spindle. The detent is movable in a radial direction relative to a longitudinal axis of the spindle to adjust the blade clamp between a locked configuration and an unlocked configuration. The spring biases the cover toward a first rotational position relative to the spindle coinciding with the locked configuration. The cover is rotatable against the bias of the spring toward a second rotational position relative to the spindle coinciding with the unlocked configuration. A portion of the detent is positioned between the first ramped surface and the second ramped surface when the blade clamp is adjusted between the locked configuration and the unlocked position such that the portion of the detent remains between the first ramped surface and the second ramped surface throughout an entire range of adjustment of the cover between the first rotational position and the second rotational position.

The present invention provides, in yet another aspect, a reciprocating saw including a blade assembly having a spindle and a blade clamp. The blade clamp is configured to selectively secure a blade to the spindle. The blade clamp includes a cover rotatably coupled to the spindle, and a detent received within a bore of the spindle. The detent is movable in a radial direction relative to a longitudinal axis of the spindle to adjust the blade clamp between a locked configuration and an unlocked configuration. The cover is rotatable between a first rotational position relative to the spindle coinciding with the locked configuration, and a second rotational position relative to the spindle coinciding with the unlocked configuration. The reciprocating saw further includes a barrel surrounding at least a portion of the blade clamp. The barrel includes a plurality of projections extending from the barrel toward the blade clamp. At least one of the projections is engageable with the cover to rotate the cover from the second rotational position to the first rotational position, thereby adjusting the blade clamp from the unlocked configuration toward the locked configuration.

Other features and aspects of the invention will become apparent by consideration of the detailed description and accompanying drawings.

BRIEF DESCRIPTION OF THE DRAWINGS

FIG. 8 is a perspective view of a blade clamp in accordance with another embodiment of the invention for use with a reciprocating saw.

FIG. 9 is a rear perspective view of the blade clamp of FIG. 8.

FIG. 16 is a perspective view of a blade clamp in accordance with yet another embodiment of the invention for use with a reciprocating saw.

FIG. 17 is a rear perspective view of the blade clamp of FIG. 16.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
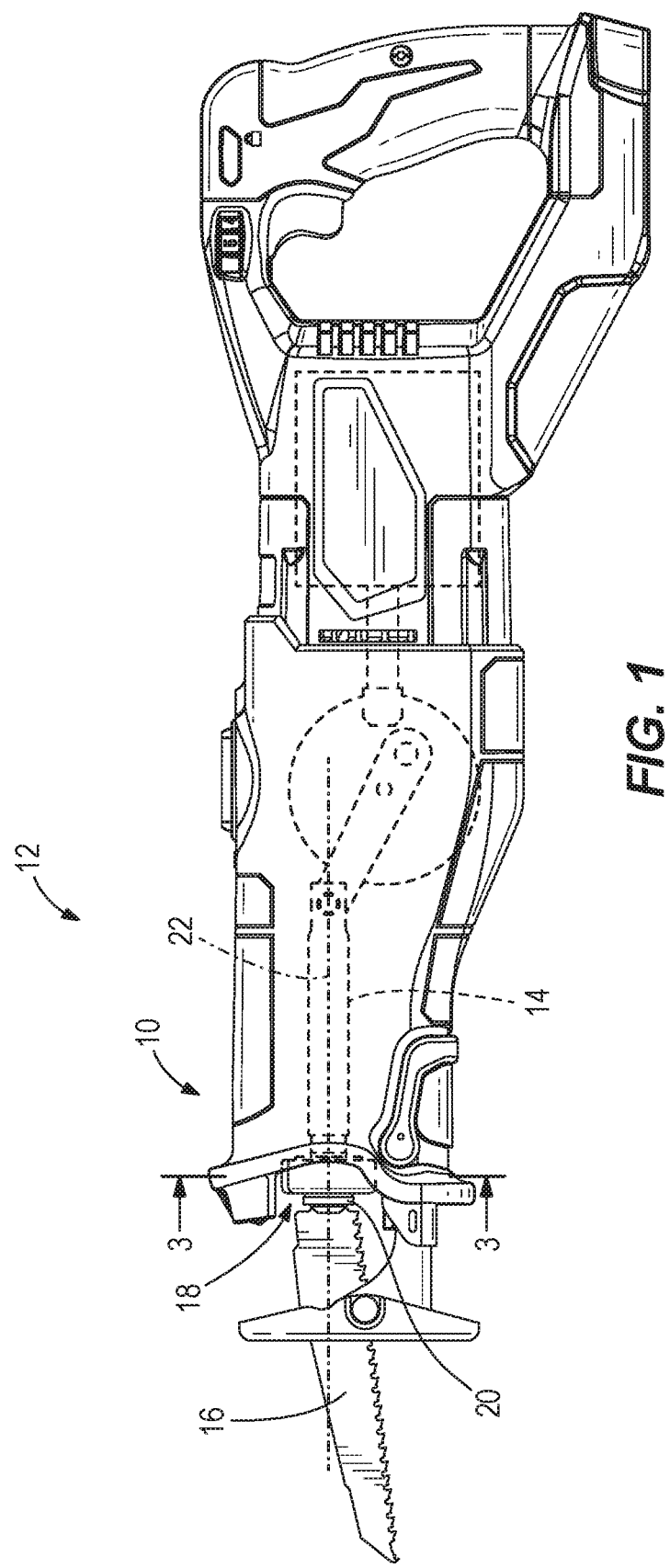
FIG. 1 is perspective view of a reciprocating saw including a blade clamp in accordance with an embodiment of the invention.

FIG. 1 of the attached drawings illustrates a reciprocating saw 12 including a blade assembly 10. The blade assembly 10 includes a spindle 14 and a blade clamp 18 to which a cutting blade 16 is attachable. The blade clamp 18 is configured to selectively secure the blade 16 within a blade slot 20 (FIG. 4) in the spindle 14. During operation of the reciprocating saw 12, reciprocating motion is imparted to the spindle 14 along a longitudinal axis 22 of the spindle 14 and the connected blade 16 for cutting a workpiece. Alternatively, the blade assembly 10 may be used with other reciprocating power tools, such as jigsaws.

Figure 2:
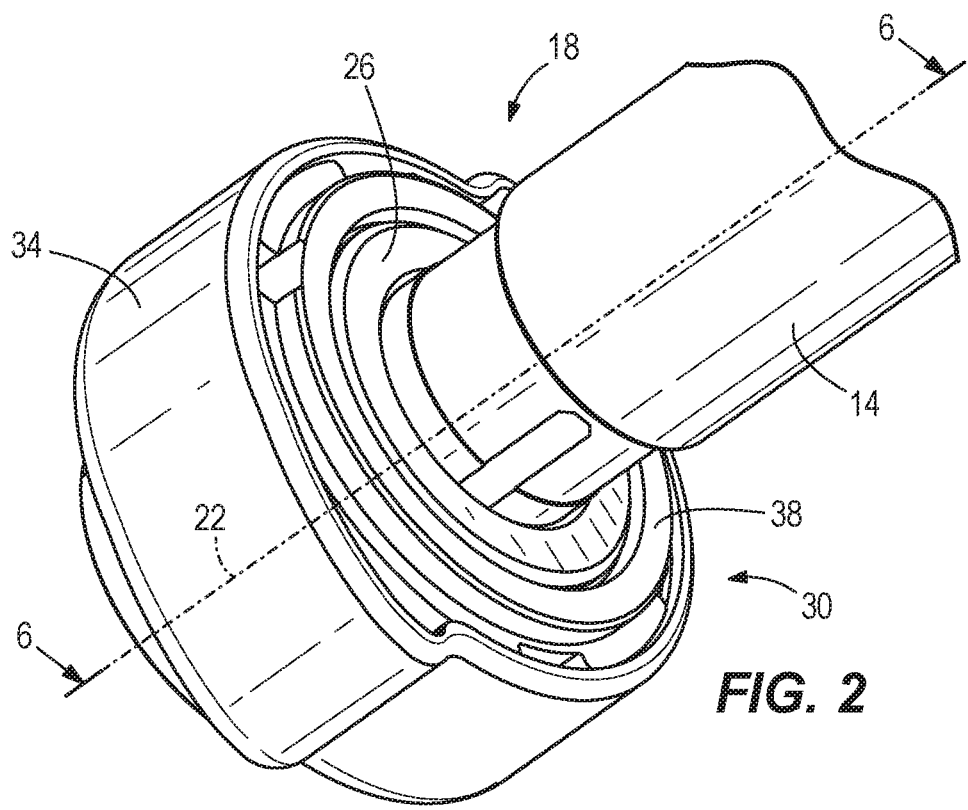
FIG. 2 is a rear perspective view of the blade clamp of FIG. 1.
Figure 4:
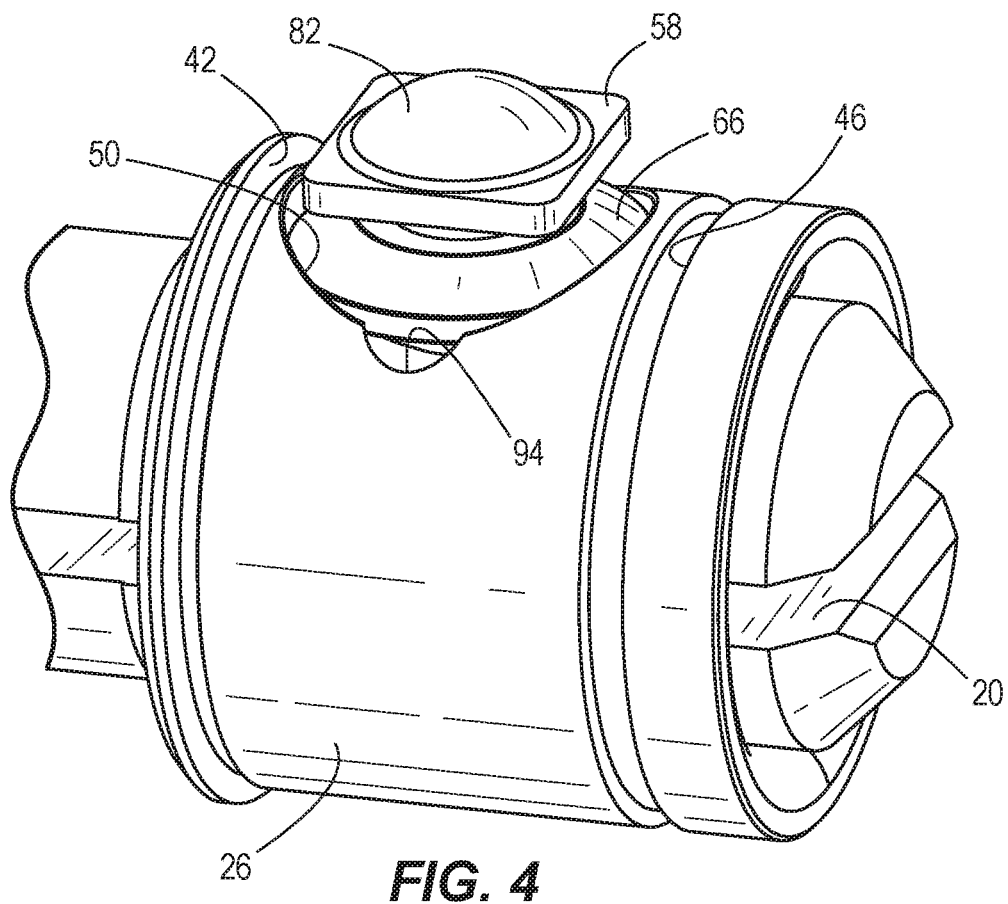
FIG. 4 is a perspective view of the blade clamp of FIG. 1, with portions removed.

With reference to FIG. 4, the blade clamp 18 includes a body 26 axially and rotationally fixed to the spindle 14 and a cover assembly 30 (FIG. 2) rotatably coupled to the body 26. The cover assembly 30 includes a first, outer cover member 34 and a second, inner cover member 38 coupled together for co-rotation about the longitudinal axis 22. The inner cover member 38 is partially received in a first circumferential groove 42 (FIG. 4) of the body 26.

With continued reference to FIG. 4, the body 26 includes a second circumferential groove 46 spaced from the first circumferential groove 42. The second circumferential groove 46 is configured to receive a retaining clip (e.g., a C-clip, not shown) for axially securing the cover assembly 30 to the body 26 while allowing rotation of the cover assembly 30. The body 26 includes a pocket or opening 50 extending radially through the body 26. The illustrated opening 50 is positioned between the first and second circumferential grooves 42, 46.

Figure 3:
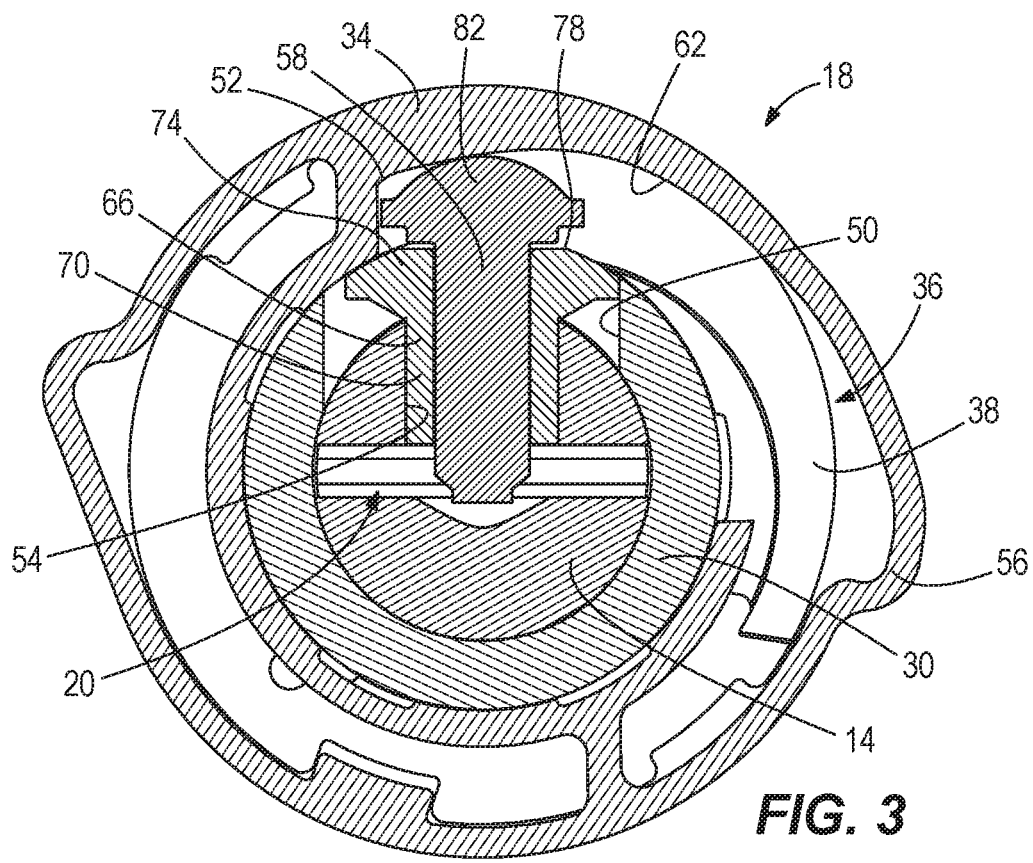
FIG. 3 is a cross-sectional view of the blade clamp of FIG. 1 taken along line 3-3 shown in FIG. 1.

With reference to FIG. 3, the outer cover member 34 includes an internal cavity 36 defined by a first, shallow end 52 and a second, deep end 56 circumferentially spaced from the shallow end 52. The internal cavity 36 is also defined by a ramped surface 62, having a progressively increasing radius from the axis 22, extending between the shallow end 52 and the deep end 56. Rotation of the cover assembly 30 rotates the ramped surface 62 relative to the spindle 14, as further discussed below.

Figure 6:
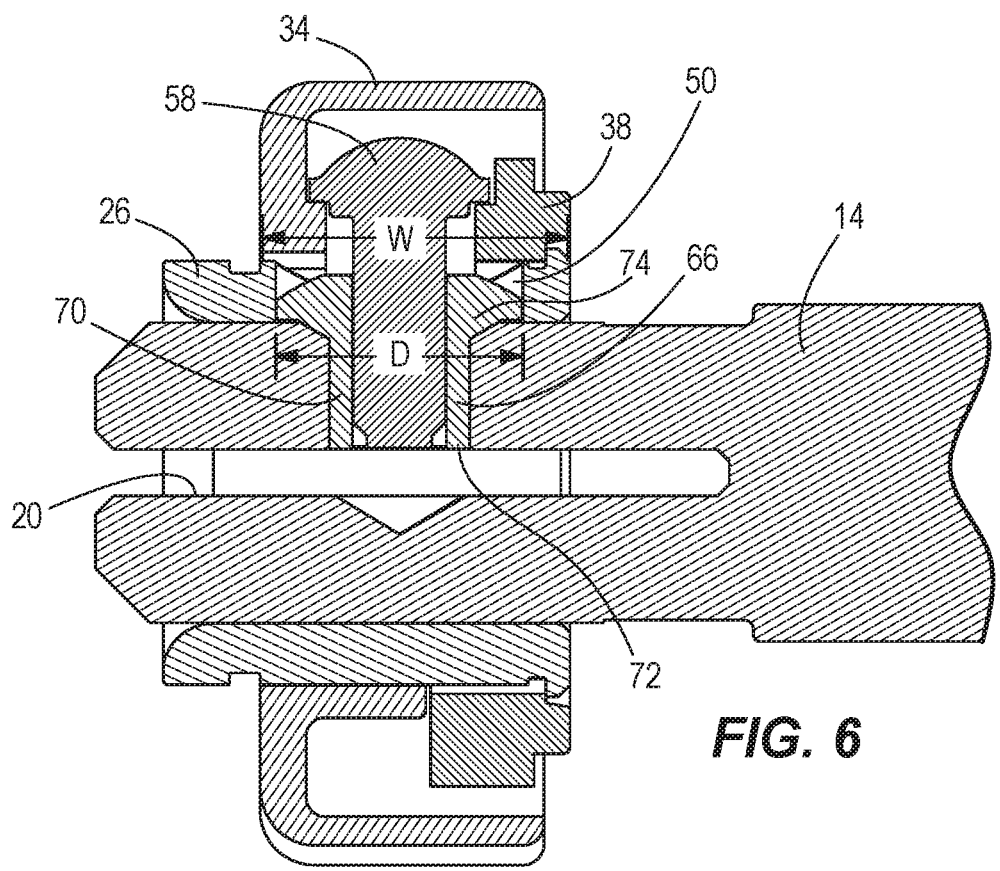
FIG. 6 is a cross-sectional view of the blade clamp of FIG. 1, taken along line 6-6 in FIG. 2, in an unlocked configuration.
Figure 7:
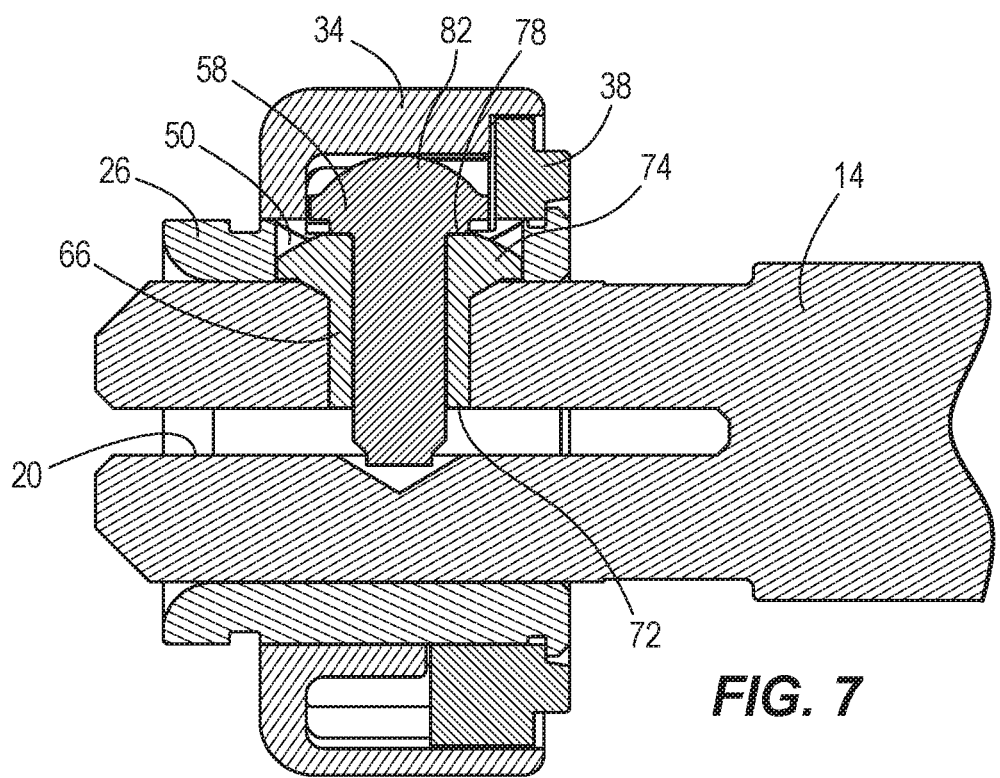
FIG. 7 is another cross-sectional view of the blade clamp of FIG. 6 in a locked configuration.

With reference to FIGS. 3 and 6-7, the spindle 14 includes a radial bore 54. Both the opening 50 and the bore 54 are configured to receive a lock pin or detent 58 such that the detent 58 extends through the body 26 and at least partially through the spindle 14. The detent 58 is configured to move radially relative to the longitudinal axis 22 within the opening 50 and the bore 54. Specifically, the ramped surface 62 of the first cover member 34 is configured to engage a head 82 of the detent 58 to impart radial displacement thereto toward the longitudinal axis 22. Furthermore, the detent 58 is further configured to displace radially through an aperture in the blade 16 when the blade 16 is inserted axially into the blade slot 20 to axially secure the blade 16 to the spindle 14.

With reference to FIGS. 3-7, the blade clamp 18 includes a sleeve 66 received within the opening 50 and the bore 54. The sleeve 66 includes a cylindrical portion 70, a flange portion 74, and an aperture 68 (FIG. 5) extending through the cylindrical and flange portions 70, 74. The detent 58 is received within the aperture 68 (FIG. 3) such that the cylindrical portion 70 surrounds the detent 58 within the bore 54. The sleeve 66 is loosely fitted within the bore 54, such that the sleeve 66 is radially movable within the opening 50 and the bore 54.

Figure 5:
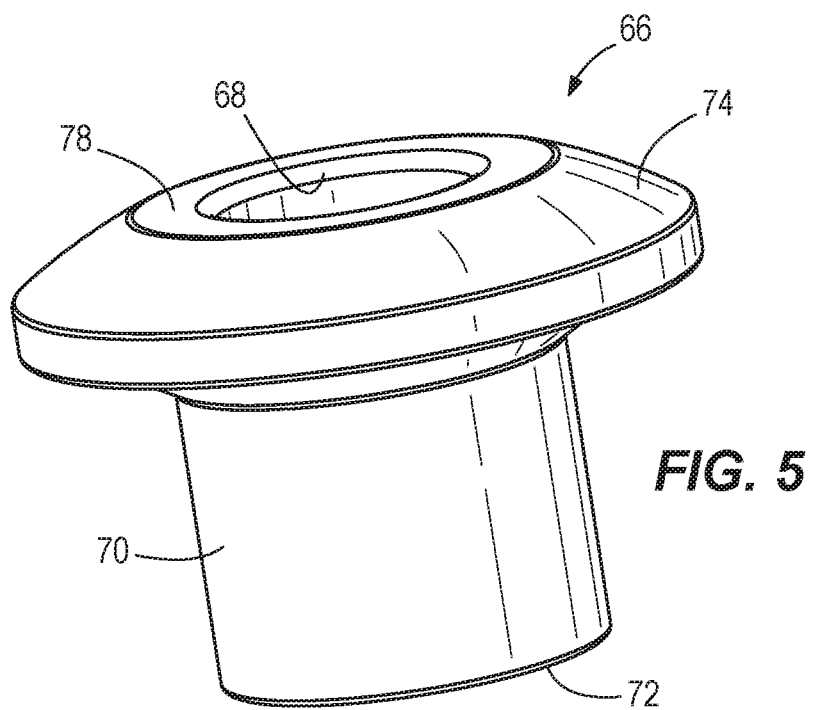
FIG. 5 is a perspective view of an anti-corrosive sleeve of the blade clamp of FIG. 1.

With reference to FIGS. 5-7, the flange portion 74 of the sleeve 66 is positioned within the opening 50 of the body 26. The flange portion 74 has a generally rounded shape such that the flange portion 74 may be received within the opening 50 without interfering with the first and second cover members 34, 38. In addition, a top surface 78 (FIG. 5) of the flange portion 74 may be adjacent and in contact with the underside of the head 82 of the detent 58 (FIG. 7) in at least one of the configurations of the blade clamp 18.

With reference to FIG. 5, the sleeve 66 is formed of a non-corrosive material. For example, the illustrated sleeve 66 is formed of stainless steel. Because a substantial portion of the detent 58 is surrounded by the sleeve 66, the amount of exposed surface area of the detent 58 is reduced, thereby inhibiting corrosion of the blade clamp 18, and the detent 58 in particular. Particularly, in one manner of operation of the saw 12 incorporating the blade assembly 10, the sleeve 66 reduces or eliminates contact between the detent 58 and liquid from pipes being cut using the saw 12.

With reference to FIGS. 6-7, the sleeve 66 is radially displaceable within the opening 50 of the body 26. Specifically, the flange portion 74 has an outer diameter D that is less than a width W defined between the outer and inner cover members 34, 38 such that the outer and inner cover members 34, 38 limit radial outward movement of the sleeve 66. Furthermore, the flange portion 74 abuts against the spindle 14, thereby preventing radial inward movement of the sleeve 66 into the blade slot 20. As such, an end 72 of the sleeve 66 opposite the flange portion 74 cannot protrude into the blade slot 20. Therefore, the sleeve 66 cannot engage the blade 16 when the blade 16 is axially inserted into the blade slot 20, and is therefore not load bearing.

With reference to FIG. 4, the opening 50 in the body 26 further includes a service notch 94. The service notch 94 provides access to the flange portion 74 of the sleeve 66. More particularly, a hand tool (e.g., screw driver, etc.) may be inserted through the service notch 94 to facilitate removal of the sleeve 66 for replacement.

With reference to FIGS. 3 and 6-7, the blade clamp 18 is adjustable between a locked configuration (FIG. 7) and an unlocked configuration (FIG. 6). Specifically, rotation of the cover assembly 30 by a user rotates the ramped surface 62 (FIG. 3) of the outer cover member 34 for engagement/disengagement with the detent 58, thereby imparting radially inward displacement to the detent 58 or permitting the detent 58 to be moved radially outward (i.e., toward/away from the longitudinal axis 22).

In operation, the blade clamp 18 is adjustable to the locked configuration (FIG. 7) by rotation of the cover assembly 30 in a clockwise direction (from the frame of reference of FIG. 3). The outer cover member 34 rotates about the spindle 14 such that the ramped surface 62 engages the head 82 of the detent 58. Subsequently, the detent 58 is displaced radially inward through the blade slot 20, and the blade 16 in the blade slot 20, thereby completing the transition of the blade clamp 18 to the locked configuration.

The blade clamp 18 is adjustable to the unlocked configuration (FIG. 6) by rotation of the of the cover assembly 30 in a counter-clockwise direction (from the frame of reference of FIG. 3). The outer cover member 34 rotates about the spindle 14 such that the ramped surface 62 disengages the head 82 of the detent 58, allowing the detent 58 to displace radially outward and be removed, at least partially or completely, from the blade slot 20 thereby completing the transition of the blade clamp 18 to the unlocked configuration. In an alternative embodiment of the blade clamp 18, a compression spring may be positioned between the flange portion 74 of the sleeve 66 and the underside of the detent head 82 to bias the head 82 against the ramped surface 62. In such an embodiment, the spring would rebound during the transition from the locked configuration to the unlocked configuration, pushing the detent 58 out of the blade slot 20. In addition, the head 82 of the detent 58 disengages the top surface 78 of the sleeve 66 such that the sleeve 66 may move radially outward.

The sleeve 66 surrounds the detent 58, in particular when the blade clamp 18 is in the locked configuration, such that contact between the detent 58 and the potential liquid from pipes being cut is inhibited or at least reduced. As such, the sleeve 66 is configured to inhibit corrosion of the blade clamp 18, and the detent 58 in particular.

FIGS. 8-15 of the attached drawings illustrate another embodiment of a blade assembly 110 for use with a reciprocating saw, with like components and features as the embodiment of FIGS. 1-7 being labeled with like reference numerals plus "100". The blade assembly 110 includes a spindle 114 and a blade clamp 118 to which a cutting blade 116 (FIG. 10) is attachable. The blade clamp 118 is configured to selectively secure the blade 116 within a blade slot 120 (FIG. 10) in the spindle 114.

Figure 10:
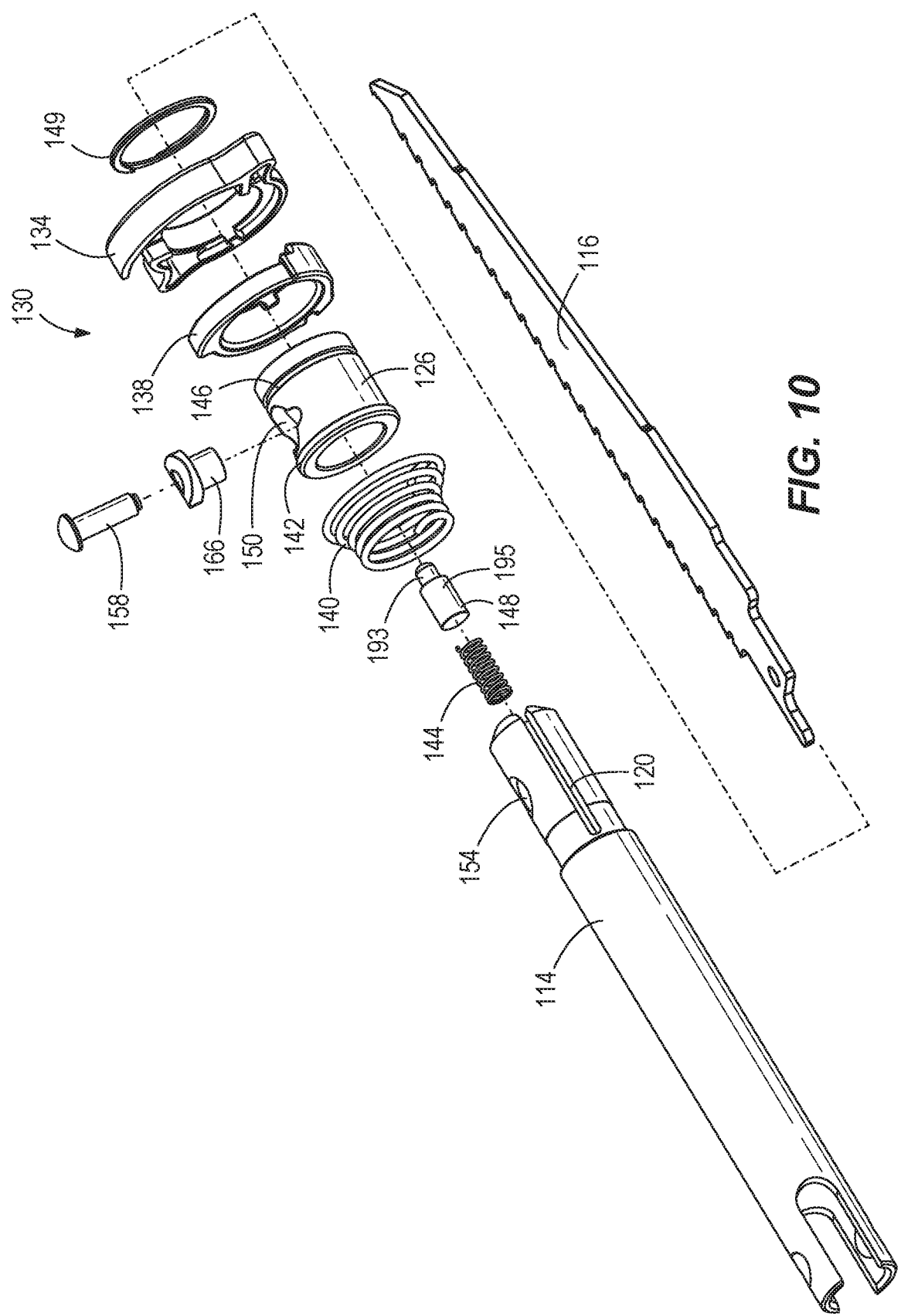
FIG. 10 is an exploded view of the blade clamp of FIG. 8.
Figure 12:
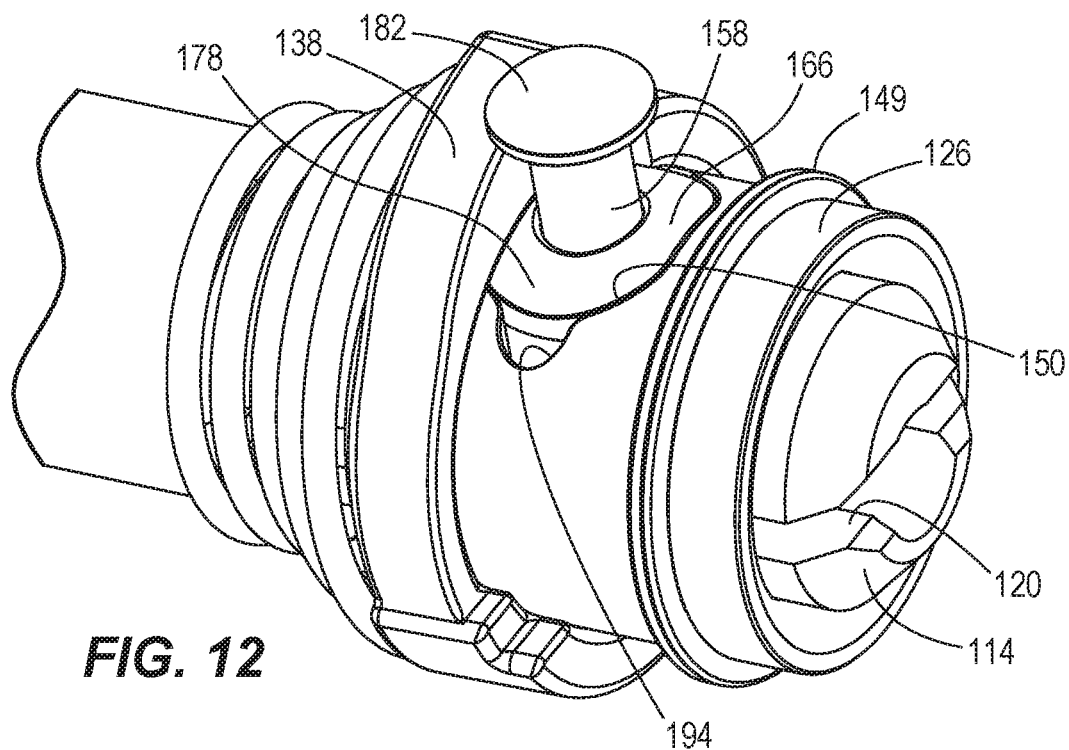
FIG. 12 is a perspective view of the blade clamp of FIG. 8, with portions removed.

With reference to FIGS. 10 and 12, the blade clamp 118 includes a body 126 axially and rotationally fixed to the spindle 114 and a cover assembly 130 (FIG. 9) rotatably coupled to the body 126. The cover assembly 130 includes a first, outer cover member 134 and a second, inner cover member 138 coupled together for co-rotation about the longitudinal axis 122. Unlike the embodiment of the blade clamp 18 of FIGS. 1-7, the blade clamp 118 includes a torsion spring 140 coupling the spindle 114 and the cover assembly 130, and a compression spring 144 and a plunger 148 positioned within the blade slot 120 of the spindle 114.

With continued reference to FIGS. 10 and 12, the inner cover member 138 is partially received in a first circumferential groove 142 (FIG. 10) of the body 126. Additionally, the body 126 includes a second circumferential groove 146 spaced from the first circumferential groove 142. The second circumferential groove 146 is configured to receive a retaining clip (e.g., a C-clip 149) for axially securing the cover assembly 130 to the body 126 while allowing rotation of the cover assembly 130. The body 126 includes a pocket or opening 150 extending radially through the body 126. The illustrated opening 150 is positioned between the first and second circumferential grooves 142, 146.

Figure 11:
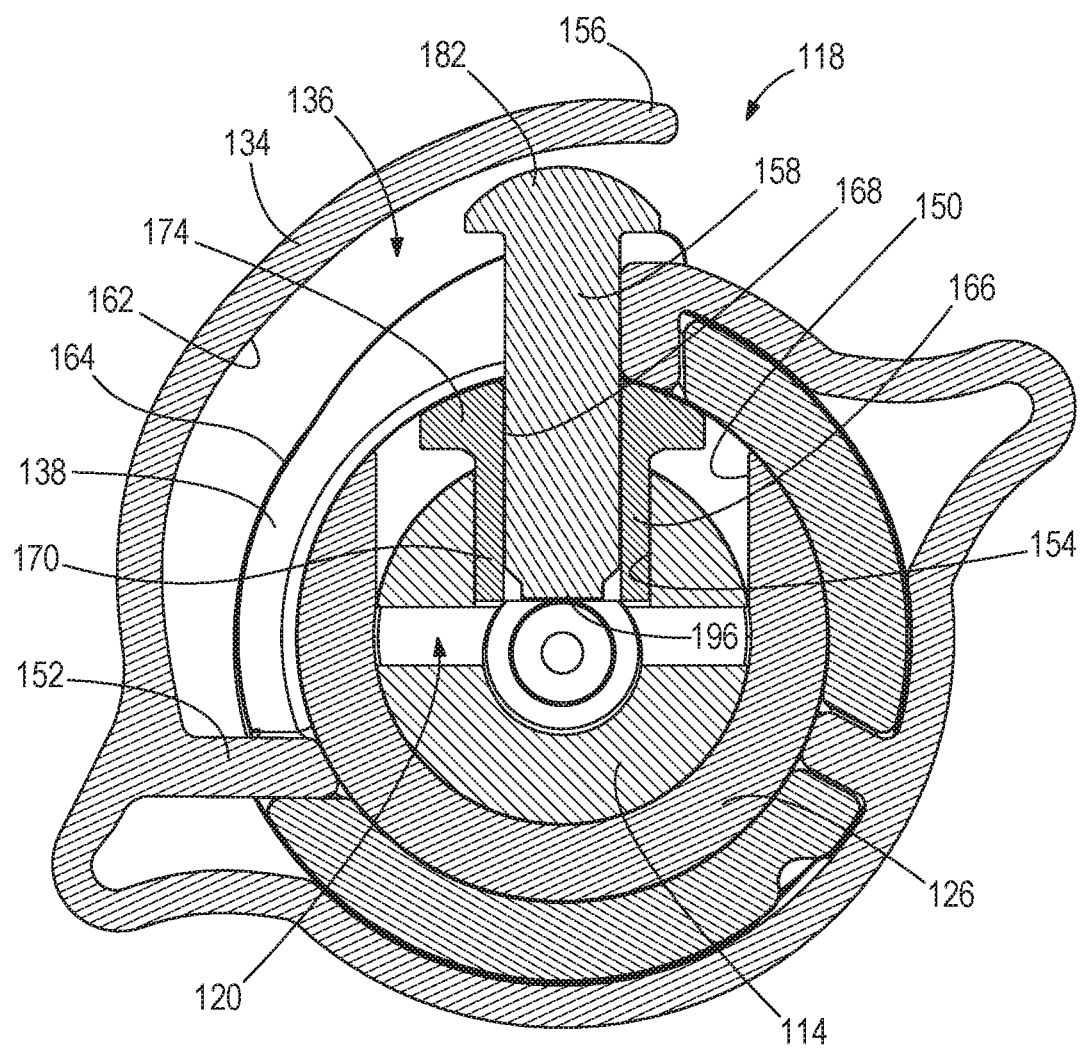
FIG. 11 is a cross-sectional view of the blade clamp of FIG. 8.

With reference to FIG. 11, the outer and inner cover members 134, 138 define an internal cavity 136 between a first, shallow end 152 and a second, deep end 156 circumferentially spaced from the shallow end 152. The internal cavity 136 is also defined between a ramped surface 162 of the outer cover member 134, and a ramped surface 164 of the inner cover member 138. In particular, the ramped surfaces 162, 164 have a progressively increasing radius from the axis 122, extending between the shallow end 152 and the deep end 154. Further, in the illustrated embodiment, the outer cover member 134 includes another ramped surface 163 (FIG. 14) spaced radially inward of the ramped surface 162. Rotation of the cover assembly 130 rotates the ramped surfaces 162, 163, 164 relative to the spindle 114, as further discussed below.

Figure 14:
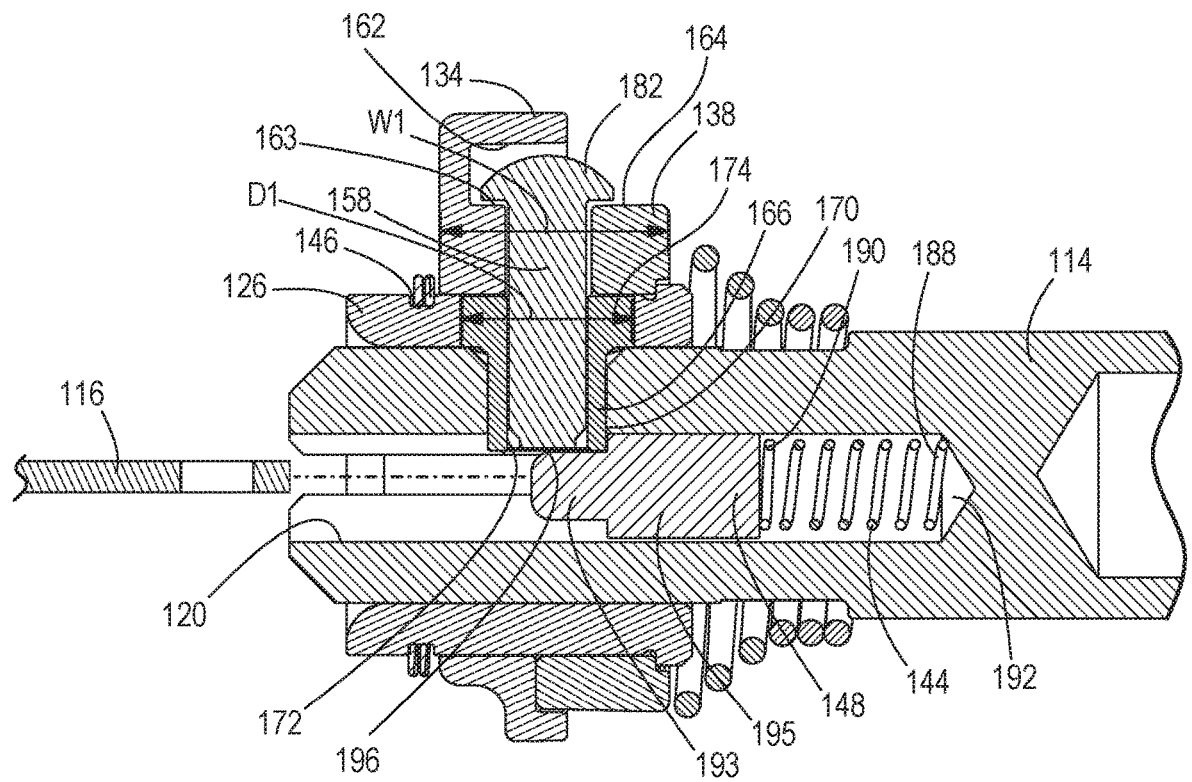
FIG. 14 is a cross-sectional view of the blade clamp of FIG. 8 in an unlocked configuration.
Figure 15:
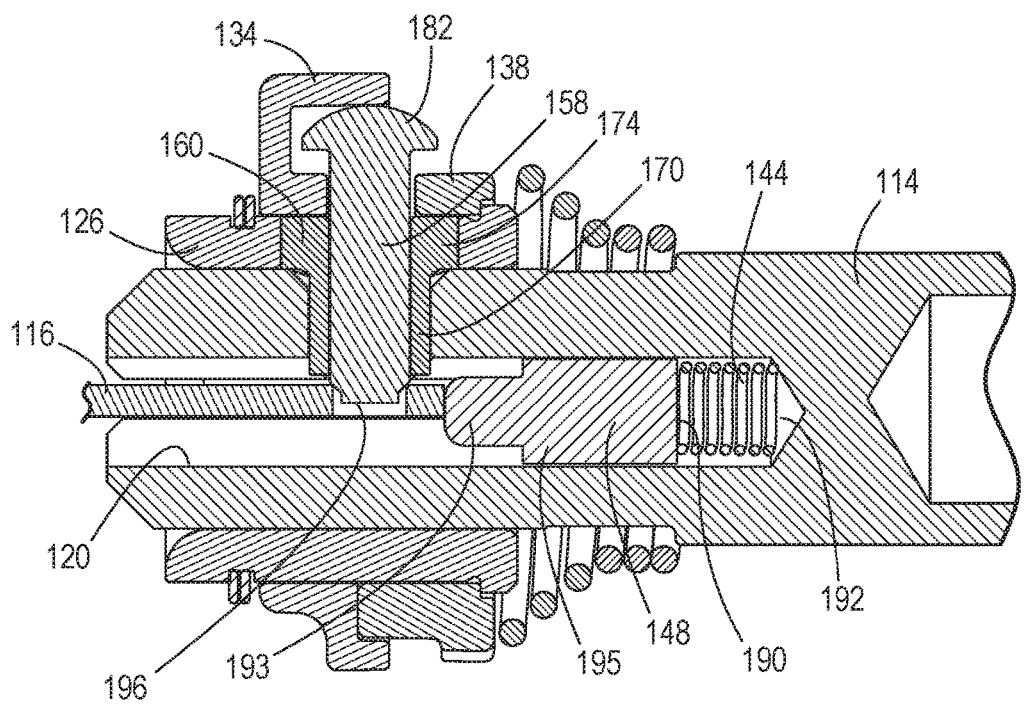
FIG. 15 is another cross-sectional view of the blade clamp of FIG. 14 in a locked configuration.

With reference to FIGS. 11 and 14-15, the spindle 114 includes a radial bore 154. The opening 150 of the body 126 and the bore 154 of the spindle 114 are radially aligned such that both the opening 150 and the bore 154 are configured to receive a lock pin or detent 158. As such, the detent 158 extends through the body 126 and at least partially through the spindle 114. The detent 158 is configured to move radially relative to the longitudinal axis 122 within the opening 150 and the bore 154. Specifically, the ramped surfaces 162, 163, 164 of the first cover member 134, and the second cover member 138, respectively, are configured to engage a head 182 of the detent 158 to impart radial displacement thereto toward and away from the longitudinal axis 122, depending upon the rotational direction of the cover assembly 130. Furthermore, the detent 158 is further configured to displace radially through an aperture in the blade 116 when the blade 116 is inserted axially into the blade slot 120 to axially secure the blade 116 to the spindle 114. In the illustrated embodiment, as shown in FIG. 14, the head 182 is supported upon the ramped surface 163 of the outer cover member 134 and the ramped surface 164 of the inner cover member 138. In other embodiments, the head 182 may be supported by only one ramped surface 163, 164.

With reference to FIGS. 11, 12, 14, and 15, the blade clamp 118 includes a sleeve 166 received within the opening 150 and the bore 154. The sleeve 166 includes a cylindrical portion 170, a flange portion 174, and an aperture 168 (FIG. 11) extending through the cylindrical and flange portions 170, 174. The detent 158 is received within the aperture 168 (FIG. 11) such that the cylindrical portion 170 surrounds the detent 158 within the bore 154.

With particular reference to FIG. 12, the flange portion 174 of the sleeve 166 is positioned within the opening 150 of the body 126. The flange portion 174 has a generally rounded shape such that the flange portion 174 may be received within the opening 150 without interfering with the second cover member 138 and/or the first cover member 134. As such, a top surface 178 (FIG. 12) of the flange portion 174 or at least a portion thereof may be adjacent the underside of the second cover member 138.

With reference to FIG. 10, the sleeve 166 is formed of a non-corrosive material. For example, the illustrated sleeve 166 is formed of stainless steel. Because a substantial portion of the detent 158 is surrounded by the sleeve 166, the amount of exposed surface area of the detent 158 is reduced, thereby inhibiting corrosion of the blade clamp 118, and the detent 158 in particular. Particularly, in one manner of operation of the saw 112 incorporating the blade assembly 110, the sleeve 166 reduces or eliminates contact between the detent 158 and liquid from pipes being cut using the saw 112. To further inhibit corrosion, other elements of the blade clamp 118 (i.e., the first cover member 134, the second cover member 138, the body 126, etc.) may be formed by, coated, or plated with a non-corrosive or corrosion resistant material. For example, in the illustrated embodiment, each of the first cover member 134, the second cover member 138, the body 126, the detent 158, the torsion spring 140, and the compression spring 144 of the blade clamp 118 is nickel plated. In other embodiments, one or more of the elements of the blade clamp 118 may be nickel plated. Further, the plunger 148 is also formed of stainless steel for inhibiting corrosion.

With reference to FIGS. 14-15, the sleeve 166 is radially secured within the opening 150 of the body 126. Specifically, the flange portion 174 has an outer diameter D1 that is greater than a width W1 defined between the outer and inner cover members 134, 138 such that the outer and inner cover members 134, 138 limit radial outward movement of the sleeve 166. Furthermore, the flange portion 174 abuts against the spindle 114, thereby preventing radial inward movement of the sleeve 166 into the blade slot 120. As such, a radial position of the sleeve 166 is fixed relative to the spindle 114. In the illustrated embodiment, an end 172 of the sleeve 166 protrudes slightly into the blade slot 120 in the fixed position. Accordingly, the fixed position of the sleeve 166 is such that the end 172 of the sleeve 166 may engage the plunger 148 but not the blade 116 when the blade 116 is axially inserted into the blade slot 120, as further discussed below. Accordingly, the sleeve 166 is fixed and the detent 158 is configured to move radially relative to the sleeve 166.

Figure 13:
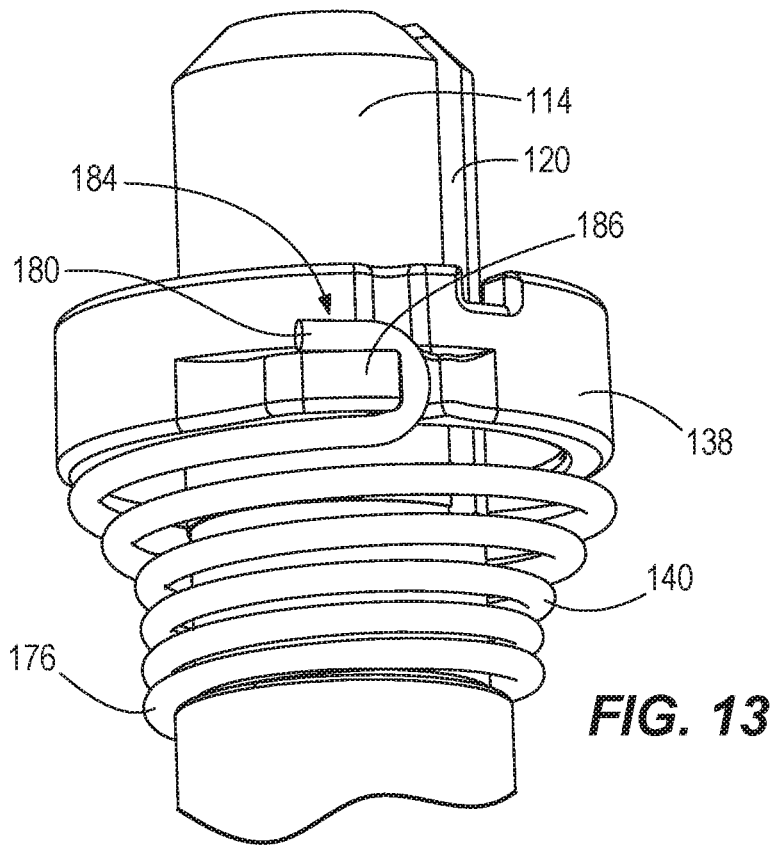
FIG. 13 is another perspective view of the blade clamp of FIG. 8, with portions removed.

As illustrated in FIG. 13, the torsion spring 140 includes a first end 176 secured to the spindle 114. A second, opposite end 180 is attached to the second cover member 138. More specifically, the torsion spring 140 includes a hook portion 184 at the second end 180 for securing the torsion spring 140 to the second cover member 138. The hook portion 184 is configured to engage a protrusion 186 of the second cover member 138. The engagement between the hook portion 184 and the protrusion 186 may limit or prevent detachment (i.e., in an axial and/or radial direction) of the second end 180 of the torsion spring 140 from the second cover member 138. The torsion spring 140 biases the cover assembly 130 toward a first rotational position relative to the body 126 and spindle 114 coinciding with a locked configuration (FIG. 15) of the blade clamp 118. The cover assembly 130 is rotatable against the bias of the torsion spring 140 toward a second rotational position relative to the body 126 and spindle 114 coinciding with an unlocked configuration (FIG. 14) of the blade clamp 118. In the illustrated embodiment, the torsion spring 140 biases the cover assembly 130 in a clockwise direction (from the frame of reference of FIG. 11) toward the locked configuration.

With reference to FIG. 9, the head 182 of the detent 158 is positioned between the outer and inner cover members 134, 138. More specifically, the head 182 is positioned between the inner ramped surface 162 of the outer cover member 134 and the outer ramped surfaces 163, 164 of the outer and inner cover members 134, 138, respectively, when the blade clamp 118 is in the unlocked positioned, and when the blade clamp 118 is in the locked configuration. In other words, the head 182 remains between the ramped surfaces 162, 163, 164 throughout the entire range of adjustment of the cover assembly 130 between the first rotational position and the second rotational position. The ramped surface 162 is configured to engage a top side of the head 182 to impart radially inward displacement to the detent 158 when the blade clamp 118 is adjusted from the unlocked position toward the locked position. The ramped surfaces 163, 164 is configured to engage a bottom side of the head 182 to impart radially outward displacement to the detent 158 when the blade clamp is adjusted from the locked configuration to the unlocked configuration. As such, the ramped surfaces 162, 163, 164 may facilitate radial movement of the detent 158 when the blade clamp 118 is adjusted between both the locked and unlocked configurations. As a result, the detent 158 is prevented from jamming in either of the locked or unlocked configurations because the head 182 of the detent 158 is always located radially outward of the ramped surfaces 163, 164. In other embodiments, the outer cover member 134 does not include the ramped surface 163 such that only the ramped surface 164 of the inner cover member 138 facilitates the radial outward movement of the detent 158 when the blade clamp is adjusted from the locked configuration to the unlocked configuration.

With reference to FIGS. 14-15, the compression spring 144 includes opposite first and second ends 188, 190. The first end 188 is seated against an internal end 192 of the spindle 114 that at least partially defines the blade slot 120. The second end 190 is seated against an end of the plunger 148, which is positioned within the blade slot 120. The compression spring 144 biases the plunger 148 along the longitudinal axis 122 toward the end 172 of the sleeve 166 (i.e., to the left from the frame of reference of FIG. 14). As such, the plunger 148 is axially displaceable within the blade slot 120 in opposite directions along the longitudinal axis 122.

As illustrated in FIG. 14, the plunger 148 includes a first portion 193 and a second portion 195 (FIG. 10) having a larger outer diameter than the first portion 193. The first portion 193 is sized such that the first portion 193 may be positioned radially below and engaged with a distal end 196 of the detent 158 opposite the head 182. The second portion 195 is sized such that a shoulder of the second portion 195 may engage the end 172 of the sleeve 166 in the unlocked configuration of the blade clamp 118. More specifically, the end 172 limits the axial movement of the plunger 148 along the longitudinal axis 122, such that the first portion 193 cannot extend beyond the detent 158. Furthermore, the blade 116 is configured to contact the first portion 193 of the plunger 148 for moving the plunger 148 along the longitudinal axis 122, away from the detent 158 and the end 172 of the sleeve 166 (i.e., to the right from the frame of reference of FIG. 14). More specifically, the plunger 148 is axially moved against the bias of the compression spring 144 away from the detent 158 (i.e., the distal end 196) and the sleeve 166 within the blade slot 120 by the blade 116 when the blade 116 is axially inserted into the blade slot 120.

With reference to FIG. 12, the opening 150 in the body 126 further includes a service notch 194. The service notch 194 provides access to the flange portion 174 of the sleeve 166. More particularly, a hand tool (e.g., screw driver, etc.) may be inserted through the service notch 194 to facilitate removal of the sleeve 166 for replacement.

With reference to FIGS. 11 and 14-15, the blade clamp 118 is adjustable between the locked configuration (FIG. 15) and the unlocked configuration (FIG. 14). Specifically, insertion of the blade 116 into the blade slot 120 and rotation of the cover assembly 130 by the torsion spring 140 rotates the ramped surface 162 (FIG. 11) of the outer cover member 134 for engagement with the detent 158, thereby imparting radially inward displacement to the detent 158. Rotation of the cover assembly 130 by a user permits the detent 158 to be moved radially outward (i.e., toward/away from the longitudinal axis 122).

In operation, when the blade clamp 118 is in the unlocked configuration, the plunger 148 is biased by the compression spring 140 such that first portion 193 of the plunger 148 engages the distal end 196 of the detent 158 within the blade slot 120. In particular, the cover assembly 130 is in the second rotational position such that the head 182 is positioned within the deep end 156 of the internal cavity 136, and the detent 158 is displaced radially outward (away from the longitudinal axis 122) by the engagement with the plunger 148. The cover assembly 130 is rotationally constrained in the second rotational position against the bias of the torsion spring 140 by the head 182 of the detent 158 positioned in the deep end 156. As such, the engagement between the plunger 148 and the detent 158 maintains the blade clamp 118 in the unlocked configuration.

During insertion of the blade 116 into the blade slot 120, the blade 116 displaces the plunger 148 rearward (i.e., to the right from the frame of reference of FIGS. 14-15) along the longitudinal axis 122 against the bias of the compression spring 144. After the plunger 148 disengages the detent 158, the torsion spring 140 rebounds to rotate the cover assembly 130 (e.g., clockwise from the frame of reference of FIG. 11) about the body 126 and spindle 114 from the second rotational position to the first rotational position. In particular, the biasing force of the torsion spring 140 rotates the cover assembly 130 such that the ramped surfaces 162, 163, 164 move relative to the head 182 of the detent 158, thereby repositioning the head 182 from the deep end 156 of the internal cavity 136 into the shallow end 152. Simultaneously, the detent 158 is displaced radially inward through the blade slot 120, and the blade 116 in the blade slot 120, thereby completing the transition of the blade clamp 118 to the locked configuration. As such, insertion of the blade 116 by a user automatically adjusts the blade clamp 118 from the unlocked configuration to the locked configuration.

The blade clamp 118 is adjustable to the unlocked configuration (FIG. 14) by rotation of the of the cover assembly 130 by a user in a counter-clockwise direction (from the frame of reference of FIG. 11). The outer cover member 134 is rotated about the body 126 and spindle 114 against the bias of the torsion spring 140 from the first rotational position to the second rotational position such that the ramped surfaces 162, 163, 164 moves relative to the head 182 of the detent 158. In particular, the movement of the cover assembly 130 causes the ramped surfaces 163, 164 to impart radially outward displacement of the detent 158, thereby adjusting the position of the head 182 from the shallow end 152 of the internal cavity 136 into the deep end 156. After the distal end of the detent 158 is partially removed from the blade slot 120, the compression spring 14 rebounds, thereby axially displacing the plunger 148 along the longitudinal axis 122 to partially eject the saw blade 116 from the blade slot 120, completing the transition of the blade clamp 118 to the unlocked configuration. The first portion 193 of the plunger 148, by the force of the compression spring 144, remains in contact with the distal end 196 of the detent 158 for again maintaining the blade clamp 118 in the unlocked configuration until the blade 116 is inserted into the blade slot 120. Because the blade clamp 118 is normally maintained in the unlocked configuration when a blade 116 is not attached, the blade clamp 118 may allow insertion of the blade 116 by the user only using one hand.

The sleeve 166 surrounds the detent 158, in particular when the blade clamp 118 is in the locked configuration, such that exposure of the detent 158 to liquid sprayed onto the blade clamp 118 is inhibited or at least reduced. As such, the sleeve 166 is configured to inhibit corrosion of the blade clamp 118, and the detent 158 in particular.

FIGS. 16-22 of the attached drawings illustrate another embodiment of a blade assembly 210 for use with a reciprocating saw, with like components and features as the blade assembly 110 shown in FIGS. 8-15 being labeled with like reference numerals plus "100". The blade assembly 210 includes a spindle 214 and a blade clamp 218 to which a cutting blade 216 (FIG. 18) is attachable. The blade clamp 218 is configured to selectively secure the blade 216 within a blade slot 220 (FIG. 18) in the spindle 214.

Figure 18:
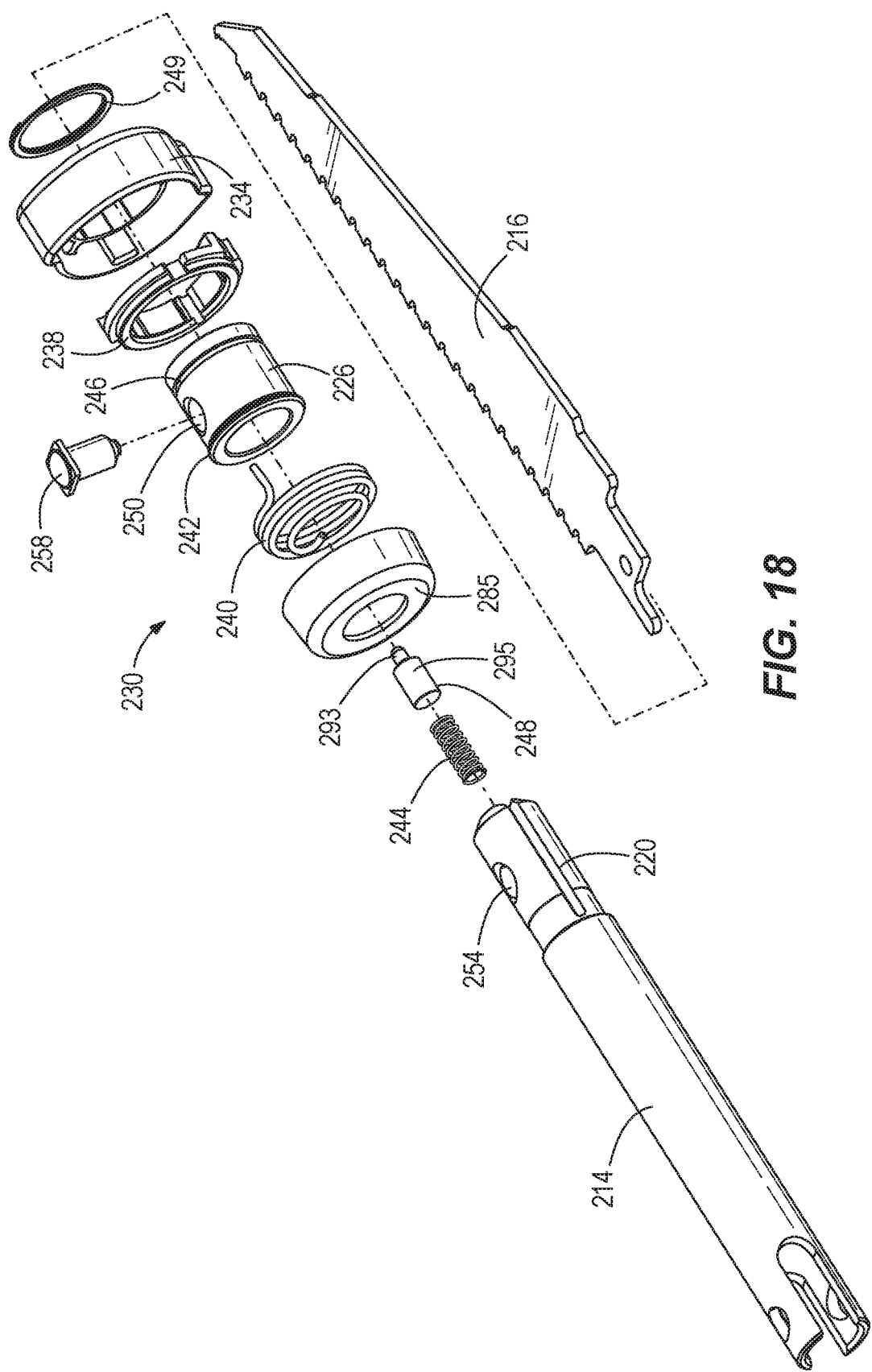
FIG. 18 is an exploded view of the blade clamp of FIG. 16.
Figure 20:
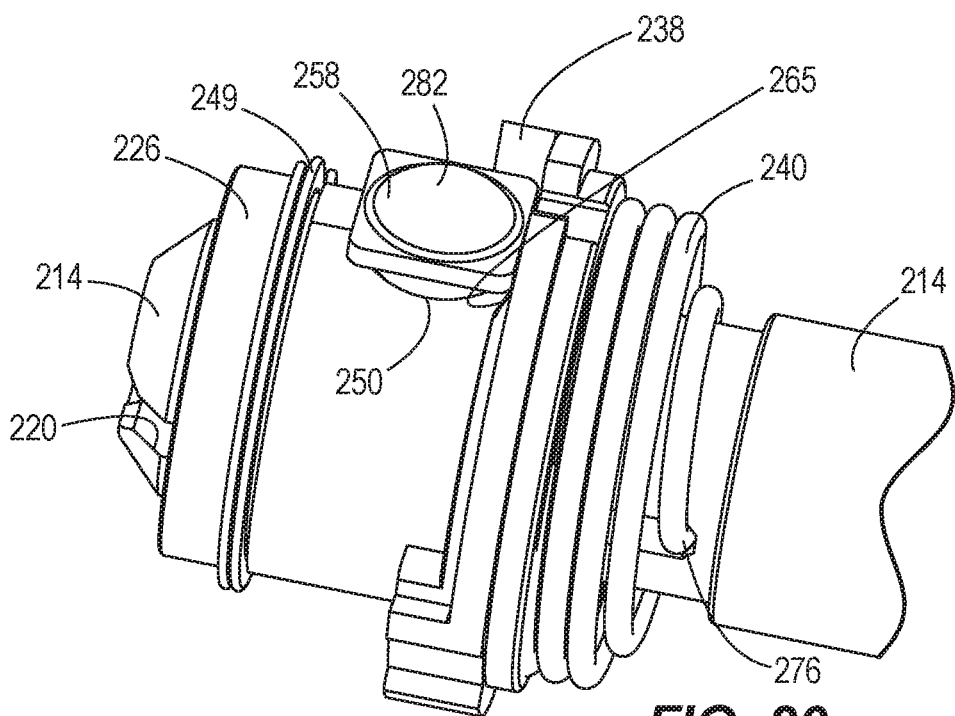
FIG. 20 is a perspective view of the blade clamp of FIG. 16, with portions removed.

With reference to FIGS. 18 and 20, the blade clamp 218 includes a body 226 axially and rotationally fixed to the spindle 214 and a cover assembly 230 (FIG. 17) rotatably coupled to the body 226. The cover assembly 230 includes a first, outer cover member 234 and a second, inner cover member 238 coupled together for co-rotation about the longitudinal axis 222. The blade clamp 218 includes a torsion spring 240 coupling the spindle 214 and the cover assembly 230, and a compression spring 244 and a plunger 248 positioned within the blade slot 220 of the spindle 214.

With continued reference to FIGS. 18 and 20, the inner cover member 238 is partially received in a first circumferential groove 242 (FIG. 18) of the body 226. Additionally, the body 226 includes a second circumferential groove 246 spaced from the first circumferential groove 242. The second circumferential groove 246 is configured to receive a retaining clip (e.g., a C-clip 249) for axially securing the cover assembly 230 to the body 226 while allowing rotation of the cover assembly 230. The body 226 includes a pocket or opening 250 extending radially through the body 226. The illustrated opening 250 is positioned between the first and second circumferential grooves 242, 246.

Figure 19:
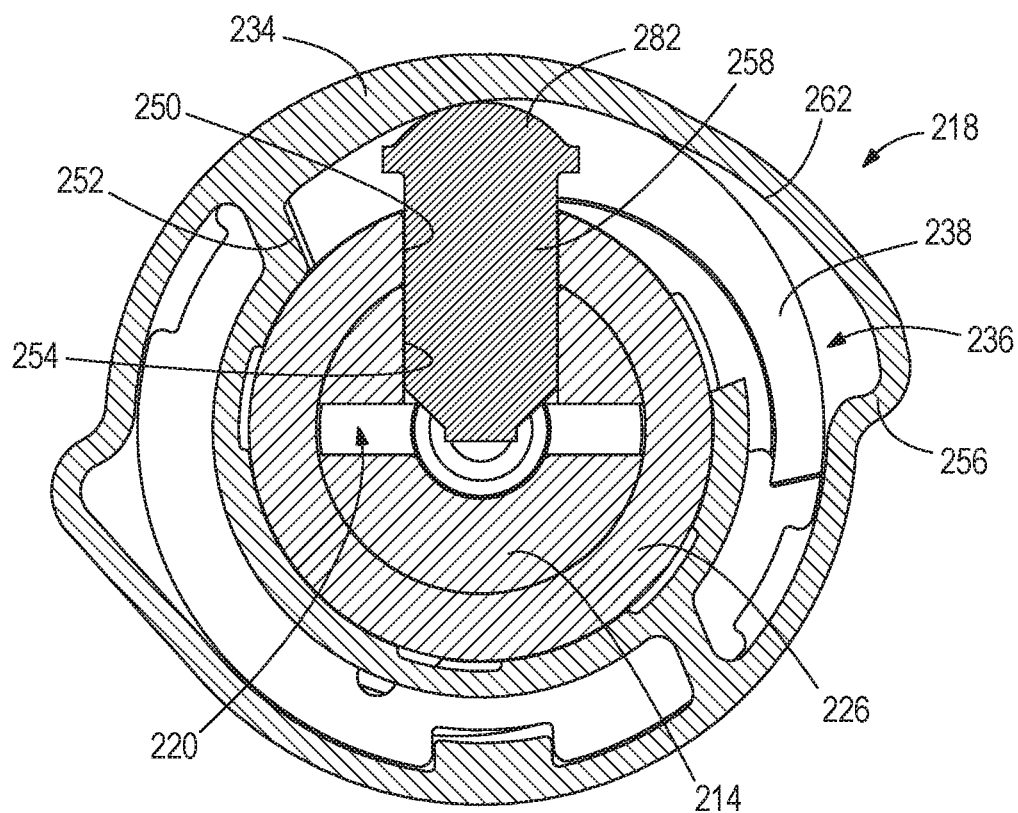
FIG. 19 is a cross-sectional view of the blade clamp of FIG. 16.

With reference to FIG. 19, the outer cover member 234 includes an internal cavity 236 defined by a first, shallow end 252 and a second, deep end 256 circumferentially spaced from the shallow end 252. The internal cavity 236 is also defined by a ramped surface 262 of the outer cover member 234 having a progressively increasing radius from the axis 222 and extending between the shallow end 252 and the deep end 256. Further, as illustrated in FIG. 20, the inner cover member 238 includes a ramped surface 265 extending partially from the deep end 256 toward the shallow end 252. Rotation of the cover assembly 320 rotates the ramped surface 262 and the ramped surface 265 relative to the spindle 214, as further discussed below.

Figure 21:
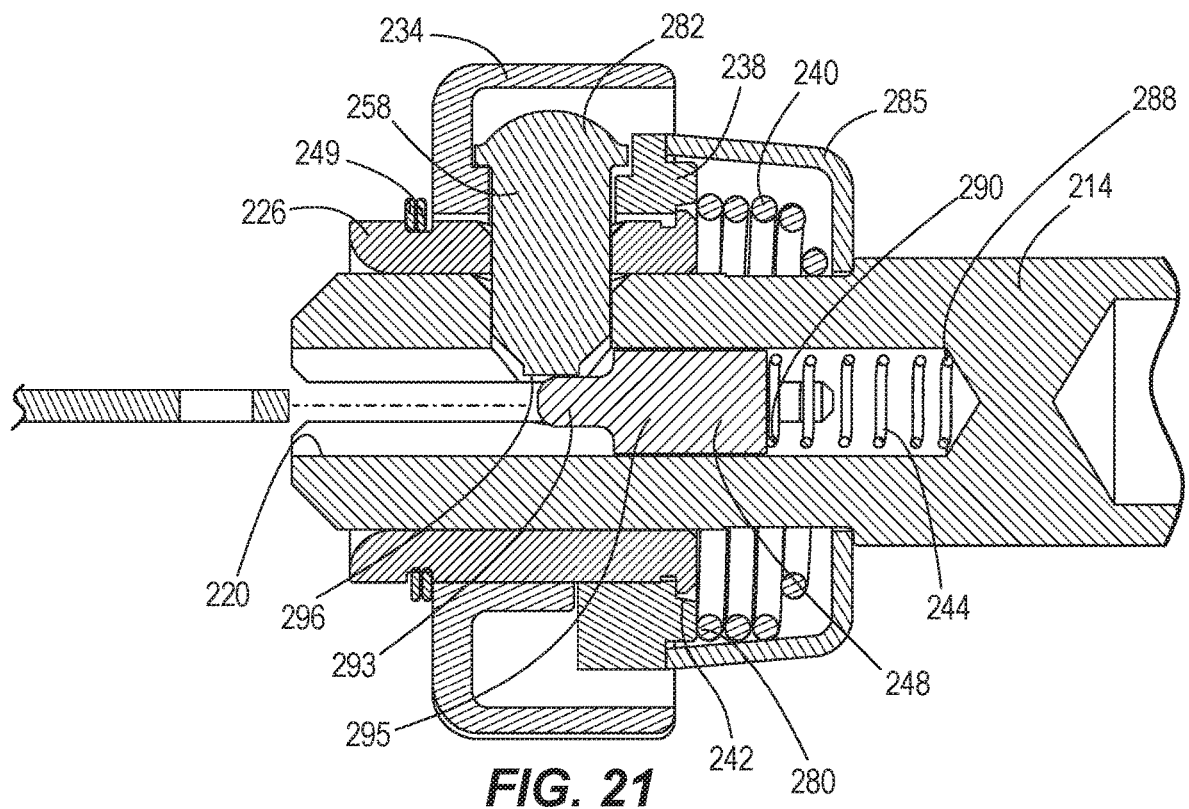
FIG. 21 is a cross-sectional view of the blade clamp of FIG. 16 in an unlocked configuration.
Figure 22:
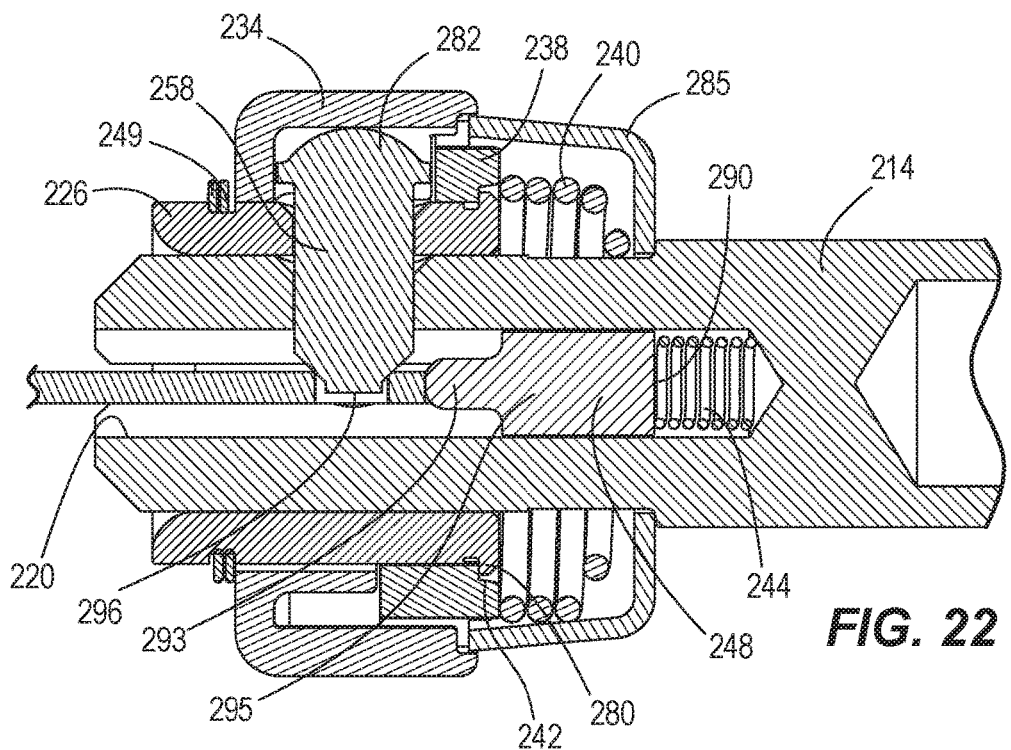
FIG. 22 is another cross-sectional view of the blade clamp of FIG. 22 in a locked configuration.

With reference to FIGS. 19 and 21-22, the spindle 214 includes a radial bore 254. The opening 250 of the body 226 and the bore 254 of the spindle 214 are radially aligned such that both the opening 250 and the bore 254 are configured to receive a lock pin or detent 258. As such, the detent 258 extends through the body 226 and at least partially through the spindle 214. The detent 258 is configured to move radially relative to the longitudinal axis 222 within the opening 250 and the bore 254. Specifically, the ramped surface 262 of the first cover member 234 and the ramped surface 265 of the second cover member 238 is configured to engage a head 282 of the detent 258 to impart radial displacement thereto toward and away from the longitudinal axis 222, depending upon the rotational direction of the cover assembly. Furthermore, the detent 258 is further configured to displace radially through an aperture in the blade 216 when the blade 216 is inserted axially into the blade slot 220 to axially secure the blade 216 to the spindle 214.

As illustrated in FIG. 20, the torsion spring 240 includes a first end 276 secured to the spindle 214. A second, opposite end 280 (FIG. 21) is attached to the second cover member 238. The blade clamp 218 further includes a spring cover 285 secured to the spindle 214 (FIG. 17). The spring cover 285 may limit or prevent detachment (i.e., in an axial and/or radial direction) of the second end 280 of the torsion spring 240 from the spindle 214 and the second cover member 238. And, the spring cover 285 encloses the torsion spring 240 to inhibit liquid or other debris from contacting the torsion spring 240, thereby inhibiting corrosion of the torsion spring 240. The torsion spring 240 biases the cover assembly 230 toward a first rotational position relative to the body 226 and spindle 214 coinciding with a locked configuration (FIG. 22) of the blade clamp 218. The cover assembly 230 is rotatable against the bias of the torsion spring 240 toward a second rotational position relative to the body 226/spindle 214 coinciding with an unlocked configuration (FIG. 21) of the blade clamp 218. In the illustrated embodiment, the torsion spring 240 biases the cover assembly 230 in a clockwise direction (from the frame of reference of FIG. 19).

With reference to FIG. 20, the head 282 of the detent 258 is positioned between the body 226 and the outer cover member 234 when the blade clamp 218 is in the locked configuration (i.e., when the cover assembly 230 is in the first rotational position). More specifically, in the locked configuration of the blade clamp 218, the head 282 is positioned directly adjacent an outer surface of the body 226 and the ramped surface 265 is circumferentially spaced from the detent head 282 (and thus not yet engaged with the detent head 282). The ramped surface 262 is configured to engage a top side of the head 282 to impart radially inward displacement to the detent 258 when the blade clamp 218 is adjusted from the unlocked position toward the locked position. Unlike the embodiment of the blade clamp 118 of FIGS. 8-15, the ramped surface 265 is configured to engage a bottom side of the head 282 at a predetermined circumferential position of the cover assembly 230 between the first and second rotational positions of the cover assembly 230 coinciding with the locked and unlocked configurations of the blade clamp 218, respectively. When the blade clamp 21 is adjusted from the locked configuration toward the unlocked configuration, the detent 258 is displaced radially outward only after the ramped surface 265 engages the detent head 282, creating a gap between the detent head 282 and the outer peripheral surface of the body 226. As such, the ramped surfaces 262, 265 may facilitate radial movement of the detent 258 when the blade clamp 218 is adjusted between both the locked and unlocked configurations.

With reference to FIGS. 21-22, the compression spring 244 includes opposite first and second ends 288, 290. The first end 288 is seated against an internal end 292 of the spindle 214 that at least partially defines the blade slot 220. The second end 290 is seated against an end of the plunger 248, which is positioned within the blade slot 220. The compression spring 244 biases the plunger 248 along the longitudinal axis 222 toward an end portion of the detent 258 (i.e., to the left from the frame of reference of FIG. 21). As such, the plunger 248 is axially displaceable within the blade slot 220 in opposite directions along the longitudinal axis 222.

As illustrated in FIG. 21, the plunger 248 includes a first portion 293 and a second portion 295 (FIG. 18) having a larger outer diameter than the first portion 293. The first portion 293 is sized such that the first portion 293 may be positioned radially below and engaged with a distal end 296 of the detent 258 opposite the head 282. The second portion 295 is sized such that a shoulder of the second portion 295 may engage the distal end 296 of the detent 258 in the unlocked configuration of the blade clamp 218. More specifically, the distal end 296 of the detent 258 limits the axial movement of the plunger 248 along the longitudinal axis 222, such that the first portion 293 cannot extend beyond the detent 258. Furthermore, the blade 216 is configured to contact the first portion 293 of the plunger 248 for moving the plunger 248 along the longitudinal axis 222, away from the detent 258 (i.e., to the right from the frame of reference of FIG. 21). More specifically, the plunger 248 is axially moved against the bias of the compression spring 244 away from the detent 258 (i.e., the distal end 296) within the blade slot 220 by the blade 216 when the blade 216 is axially inserted into the blade slot 220.

With reference to FIGS. 19 and 21-22, the blade clamp 218 is adjustable between the locked configuration (FIG. 22) and the unlocked configuration (FIG. 21). Specifically, insertion of the blade 216 into the blade slot 220 and rotation of the cover assembly 230 by the torsion spring 240 rotates the ramped surface 262 (FIG. 19) of the outer cover member 234 for engagement with the detent 258, thereby imparting radially inward displacement to the detent 258. Rotation of the cover assembly 230 by a user permits the detent 258 to be moved radially outward (i.e., toward/away from the longitudinal axis 222).

In operation, when the blade clamp 218 is in the unlocked configuration, the plunger 248 is biased by the compression spring 240 such that first portion 293 of the plunger 248 engages the distal end 296 of the detent 258 within the blade slot 220. In particular, the cover assembly 230 is in the second rotational position such that the head 282 is positioned within the deep end 256 of the internal cavity 236, and the detent 258 is displaced radially outward (away from the longitudinal axis 222) by the engagement with the plunger 248. The cover assembly 230 is rotationally constrained in the second rotational position against the bias of the torsion spring 240 by the head 282 of the detent 258 positioned in the deep end 256. As such, the engagement between the plunger 248 and the detent 258 maintains the blade clamp 218 in the unlocked position.

During insertion of the blade 216 into the blade slot 220, the blade 216 displaces the plunger 248 rearward (i.e., to the right from the frame of reference of FIGS. 21-22) along the longitudinal axis 222 against the bias of the compression spring 244. After the plunger 248 disengages the distal end 296 of the detent 258, the torsion spring 240 rebounds to rotate the cover assembly 230 (e.g., clockwise from the frame of reference of FIG. 19) about the body 226 and spindle 214 from the second rotational position to the first rotational position. In particular, the biasing force of the torsion spring 240 rotates the cover assembly 230 such that the ramped surface 262 moves relative to the head 282 of the detent 258, thereby repositioning the head 282 from the deep end 256 of the internal cavity 236 into the shallow end 252. Simultaneously, the detent 258 is displaced radially inward through the blade slot 220, and the blade 216 in the blade slot 220, thereby completing the transition of the blade clamp 218 to the locked configuration. As such, insertion of the blade 216 by a user automatically adjusts the blade clamp 218 from the unlocked configuration to the locked configuration.

The blade clamp 218 is adjustable to the unlocked configuration (FIG. 21) by rotation of the of the cover assembly 230 by a user in a counter-clockwise direction (from the frame of reference of FIG. 19). The outer cover member 234 is rotated about the body 226 and spindle 214 against the bias of the torsion spring 240 from the first rotational position to the second rotational position such that the ramped surfaces 262, 265 moves relative to the head 282 of the detent 258. In particular, the movement of the cover assembly 230 causes the ramped surface 265 to engage the head 282 of the detent 258 at the predetermined circumferential position, thereby adjusting the position of the head 282 from the shallow end 252 of the internal cavity 236 into the deep end 256. After the distal end 296 of the detent 258 is partially removed from the blade slot 220 in the radial direction, the compression spring 244 rebounds, thereby axially displacing the plunger 248 along the longitudinal axis 222 to partially eject the saw blade 216 from the blade slot 120, completing the transition of the blade clamp 218 to the unlocked configuration. The first portion 293 of the plunger 248, by the force of the compression spring 244, remains in contact with the distal end 296 of the detent 258 for again maintaining the blade clamp 218 in the unlocked configuration until the blade 216 is inserted into the blade slot 220. Because the blade clamp 218 is normally maintained in the unlocked configuration when a blade 216 is not attached, the blade clamp 218 may allow insertion of the blade 216 by the user only using one hand.

The blade clamp 218 of FIGS. 16-22 does not include a corrosion resistant sleeve as in the first and second embodiments of the blade clamp 18, 118, respectively. Alternatively, the spindle 214 is coated or plated with non-corrosive or corrosion resistant material. Further, other components of the blade clamp 218 (i.e., the first cover member 234, the second cover member 238, the body 226, etc.) may be formed by, coated, or plated with a corrosion resistant material. For example, in the illustrated embodiment, each of the first cover member 234, the second cover member 238, the body 226, the detent 258, the torsion spring 240, and the compression spring 244 of the blade clamp 218 is nickel plated. Further, the plunger 248 is formed of stainless steel for inhibiting corrosion.

Figure 23:
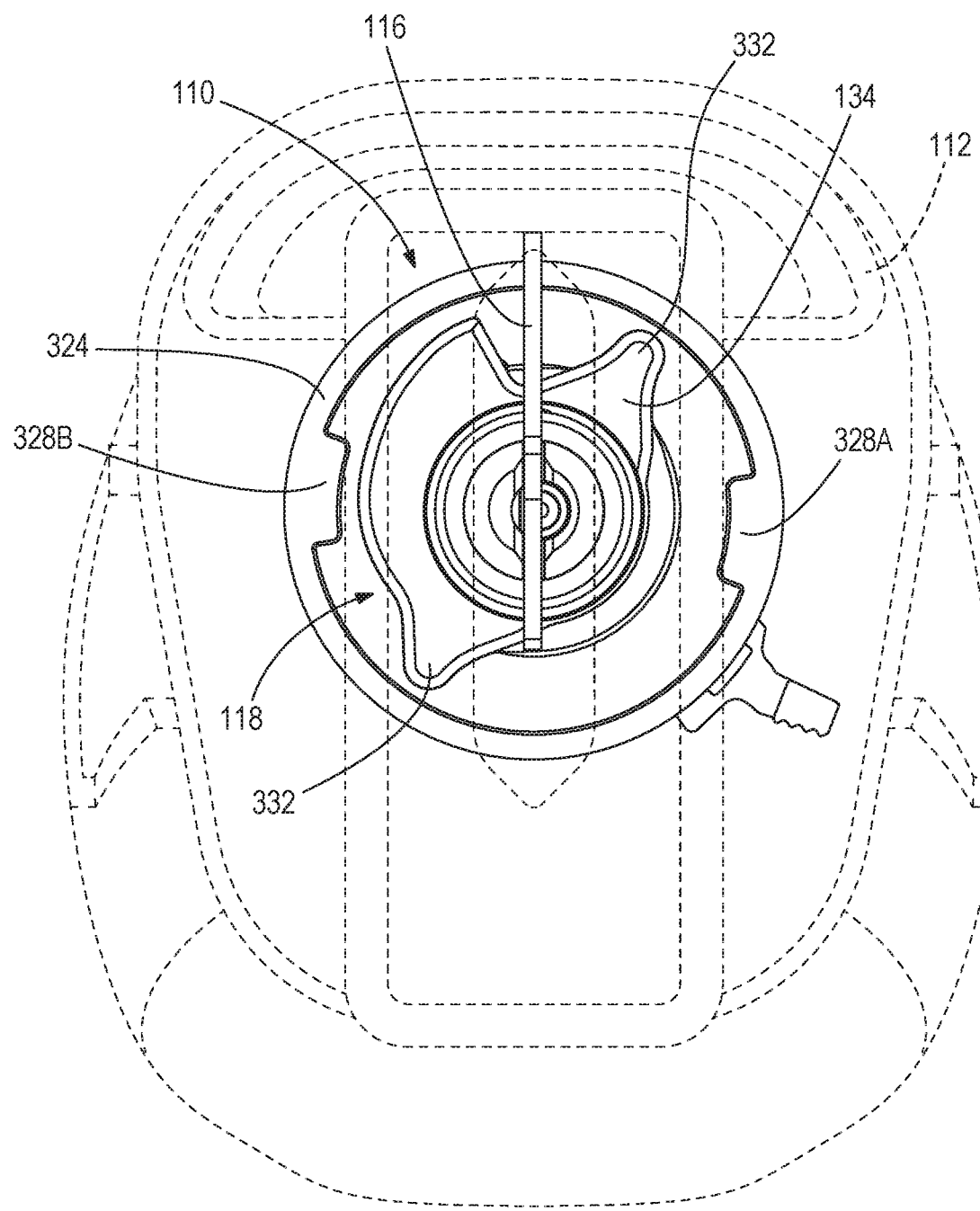
FIG. 23 is a front view of the blade clamp of FIG. 8 and a barrel of the reciprocating saw with which the blade clamp is used.

With reference to FIG. 23, the saw 12, 112 may include a barrel 324 that surrounds at least a portion of the blade clamp 18, 118, 218. For example, in the illustrated embodiment, the barrel 324 surrounds the cover assembly 130 of the blade clamp 118 of the second embodiment (FIGS. 8-15). The barrel 324 further includes a plurality of projections 328A, 328B extending from an inner surface of the barrel 324. In particular, the projections 328A, 328B extend toward the first cover member 134 of the cover assembly 130. The projections 328A, 328B may selectively engage the first cover member 134 for facilitating adjustment of the blade clamp 118 from the locked position toward the unlocked position. Specifically, the projections 328A, 328B engage tabs or arm members 332 of the outer cover member 134 when the barrel 324 is rotated (counter-clockwise from the frame of reference of FIG. 23), thereby rotating the cover assembly 130 to release the blade. Further, the projections 328A, 328B are positioned at predetermined circumferential locations on the barrel 324 such that projections 328A, 328B do not contact (i.e., rub against) the first cover member 134 during operation of the saw 12, 112, unless the blade clamp 118 is being adjusted toward the unlocked configuration.

Figure 24:
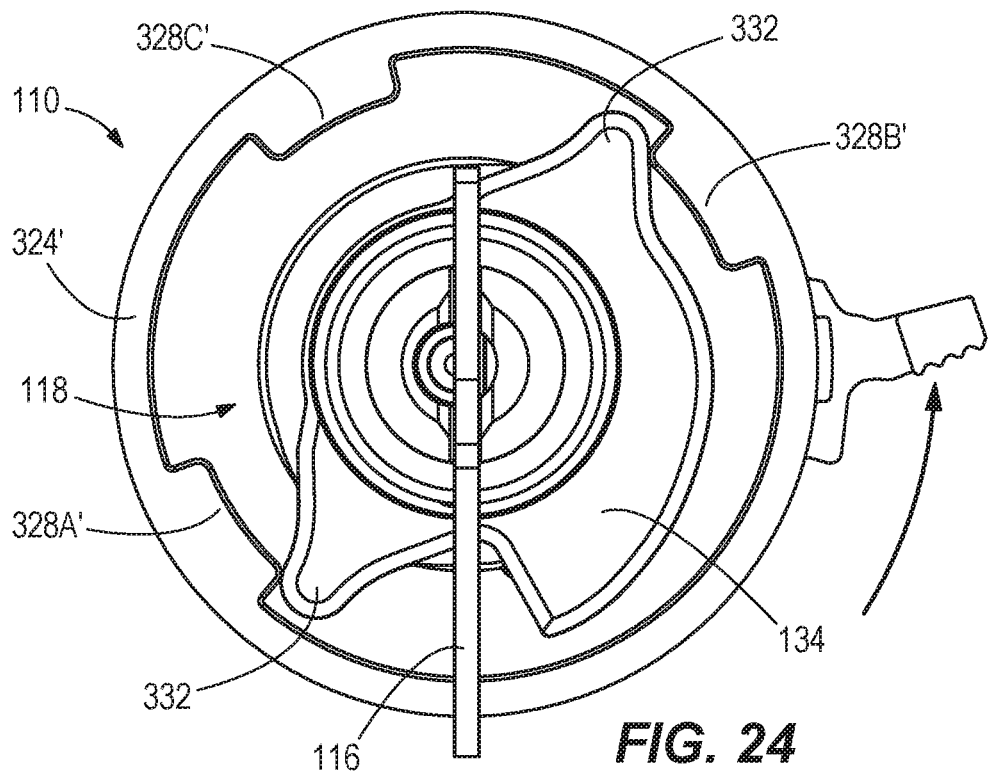
FIG. 24 is a front view of the blade clamp of FIG. 8 and another embodiment of a barrel engageable with the blade clamp when rotated in a first direction.
Figure 25:
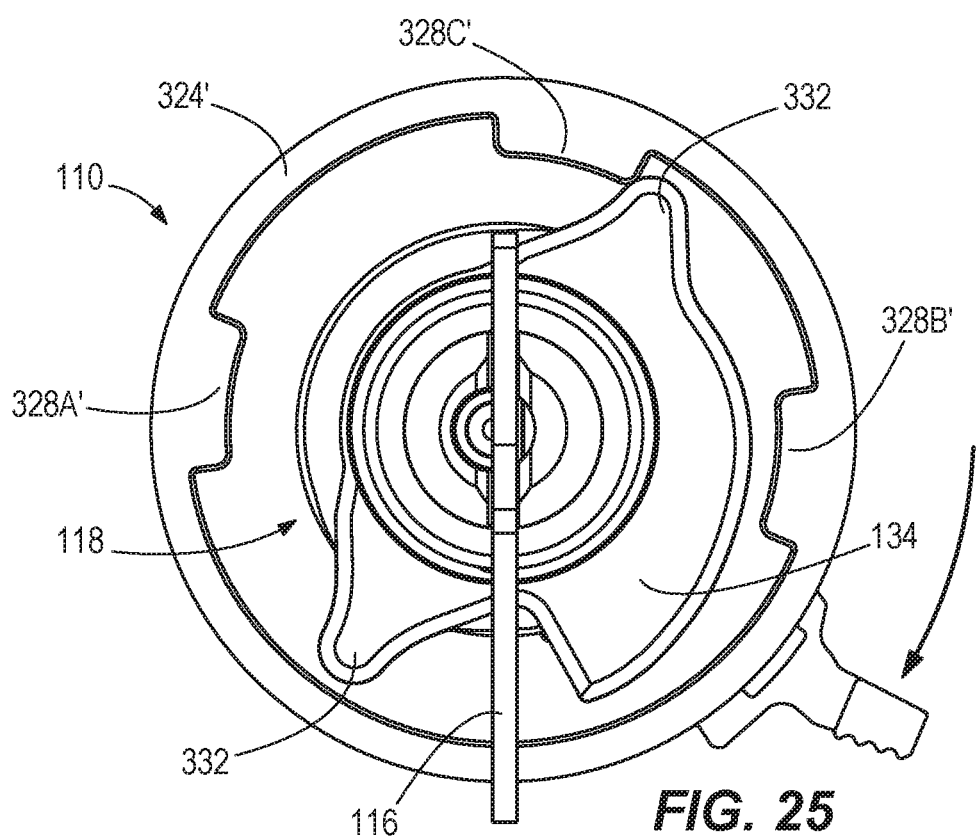
FIG. 25 is a front view of the blade clamp and barrel of FIG. 24, illustrating the barrel engageable with the blade clamp when rotated in a second direction.

With reference to FIGS. 23-25, the barrel 324 of FIG. 23 includes two projections 328A, 328B. In other embodiments, the barrel 324 may include one or more projections 328A-328C. For example, as shown in FIGS. 24-25, a barrel 324' of the saw 12, 112 includes three projections 328A'-328C'.

With reference to FIGS. 24-25, the projections 328A'-328C' may selectively engage the first cover member 134, 234 for facilitating adjustment of the blade clamp 118, 218 between both the unlocked configuration and the locked configuration. The projections 328A', 328B' of the barrel 324' engage the arm members 332 of the outer cover member 34, 134, 234 when the barrel 324' is rotated in a first direction, and the projection 328C' engages one of the arm members 332 when the barrel 342' is rotated in a second direction that is opposite the first direction. For example, as shown in FIG. 24, when adjusting the blade clamp 118 to the unlocked configuration, the barrel 324' is rotated in the counter-clockwise direction (from the frame of reference of FIG. 24), thereby causing the projections 328A', 328B' to engage the arm members 332. The engagement causes the cover assembly 130 to rotate, thereby releasing the saw blade 116.

If accumulated debris within the blade clamp 18, 118, 218 and/or corrosion inhibit the torsion spring 140, 240 from rebounding to rotate the cover assembly 30, 130, 230 toward the first position (coinciding with the locked configuration of the blade clamp 18, 118, 218), the barrel 324' is rotatable in an opposite, clockwise direction (from the frame of reference of FIG. 25), thereby causing the projection 328C' to engage one of the arm members 332. The engagement causes the cover assembly 130 to rotate, assisting the torsion spring 140, 240 to return the cover assembly 130 to the first position (coinciding with the locked configuration of the blade clamp 18, 118, 218). When it is desired to release the saw blade 116, the barrel 324' is rotatable in the direction shown in FIG. 24, engaging the opposed arm members 332 with the projections 328A', 328B', causing the cover assembly 130 to rotate from the first position toward the second position (coinciding with the unlocked configuration of the blade clamp 18, 118, 218). Although the configuration of the barrel 324' and the projections 328A'-328C' have only been shown with respect to the second embodiment of FIGS. 8-15, the configuration of the barrel 324' and the projections 328A'-328C' may also be applied to the blade clamp 18 shown in FIGS. 1-7 and the blade clamp shown in FIGS. 16-22.

Various features of the invention are set forth in the following claims.

What is claimed is:

1. A blade clamp for use with a power tool having a reciprocating spindle, the blade clamp comprising:
  a cover rotatably coupled to the spindle;
  a detent received within a bore of the spindle, the detent movable in a radial direction relative to a longitudinal axis of the spindle to adjust the blade clamp between a locked configuration and an unlocked configuration,
  wherein the cover is rotatable between a first rotational position relative to the spindle coinciding with the locked configuration, and a second rotational position relative to the spindle coinciding with the unlocked configuration; and
  a sleeve in which the detent is slidably received, wherein the sleeve includes a non-corrosive material for inhibiting corrosion of the detent.

2. The blade clamp of claim 1, wherein the sleeve includes an aperture extending therethrough, and wherein the detent is received within the aperture such that a portion of the sleeve surrounds the detent within the bore.

3. The blade clamp of claim 1, wherein the sleeve is formed of stainless steel.

4. The blade clamp of claim 1, wherein at least the detent and the cover is nickel plated.

5. The blade clamp of claim 1, wherein the detent is radially displaceable relative to a longitudinal axis of the spindle by engagement with the cover when the cover is rotated between the first rotational position and the second rotational position.

6. The blade clamp of claim 1, wherein the cover includes a first ramped surface and a second ramped surface spaced radially inward of the first ramped surface, and wherein a portion of the detent is positioned between the first ramped surface and the second ramped surface when the blade clamp is adjusted between the locked configuration and the unlocked position such that the portion of the detent remains between the first ramped surface and the second ramped surface throughout an entire range of adjustment of the cover between the first rotational position and the second rotational position.

7. The blade clamp of claim 6, wherein the cover includes a first cover member and a second cover member coupled for co-rotation with the first cover member, and wherein the first ramped surface and the second ramped surface are defined on the first cover member.

8. The blade clamp of claim 6, wherein the cover includes a first cover member and a second cover member coupled for co-rotation with the first cover member, wherein the first ramped surface is defined on the first cover member, and wherein the second ramped surface is defined on the second cover member.

9. The blade clamp of claim 8, wherein the first cover member includes a third ramped surface disposed radially inward of the first ramped surface and spaced from the second ramped surface along the longitudinal axis, and wherein a head of the detent is supported upon the second ramped surface and the third ramped surface, with the first ramped surface located radially outward of the head of the detent.

10. The blade clamp of claim 6, wherein the detent is displaced radially inward relative to the longitudinal axis by the first ramped surface to engage a blade when the blade clamp is adjusted from the unlocked configuration toward the locked configuration.

11. The blade clamp of claim 6, wherein the detent is displaced radially outward relative to the longitudinal axis by the second ramped surface when the blade clamp is adjusted from the locked configuration toward the unlocked configuration.

12. The blade clamp of claim 1, further comprising a first spring biasing the cover toward the first rotational position.

13. The blade clamp of claim 12, further comprising a plunger and a second spring positioned within a blade slot of the spindle, wherein the second spring biases the plunger toward the detent in at least the unlocked configuration for maintaining the blade clamp in the unlocked configuration against the bias of the first spring, and wherein the plunger is displaceable by a blade received within the blade slot against the bias of the second spring.

14. The blade clamp of claim 13, wherein the rotation of the cover is inhibited by engagement between the plunger and the detent, and wherein, in response to insertion of the blade into the blade slot, the plunger disengages the detent, permitting the first spring to rebound and rotate the cover from the second rotational position to the first rotational position, thereby automatically adjusting the blade clamp from the unlocked configuration to the locked configuration.

15. The blade clamp of claim 13, wherein at least the first spring and the second spring is nickel plated.

16. The blade clamp of claim 13, wherein the plunger includes a first portion and a second portion having a larger outer diameter than the first portion, the second portion sized such that a shoulder of the second portion engages an end of the sleeve in the unlocked configuration of the blade clamp, and wherein the end of the sleeve is configured to limit axial movement of the plunger along the longitudinal axis within the blade slot.

17. The blade clamp of claim 1, wherein the spindle defines a bore, wherein the sleeve includes a cylindrical portion and a flange portion, the cylindrical portion received within the bore, wherein the sleeve is loosely fitted within the bore to allow radial movement of the sleeve relative to the spindle, and wherein the cylindrical portion is sized to move radially within the bore, while the flange portion is sized to limit the radial movement of the sleeve between the cover and the spindle.

18. The blade clamp of claim 1, wherein the spindle defines a bore, wherein the sleeve includes a cylindrical portion and a flange portion, the cylindrical portion received within the bore, wherein the flange portion is positioned between the cover and the spindle, and wherein the flange portion is sized to inhibit radial movement of the sleeve relative to the spindle such that the sleeve is radially secured within the bore.

* * * * *